US010826050B1

(12) United States Patent
Kaehr et al.

(10) Patent No.: US 10,826,050 B1
(45) Date of Patent: Nov. 3, 2020

(54) METHODS OF PREPARING A SAFETY BATTERY

(71) Applicants: National Technology & Engineering Solutions of Sandia, LLC, Albuquerque, NM (US); Duracell U.S. Operations, Inc., Wilmington, DE (US)

(72) Inventors: Bryan James Kaehr, Albuquerque, NM (US); Walter F. Paxton, Albuquerque, NM (US); Adam Cook, Albuquerque, NM (US); William Reinholtz, Albuquerque, NM (US); Michael Pozin, Brookfield, CT (US)

(73) Assignees: National Technology & Engineering Solutions of Sandia, LLC, Albuquerque, NM (US); Duracell U.S. Operations, Inc., Wilmington, DE (US)

( * ) Notice: Subject to any disclaimer, the term of this patent is extended or adjusted under 35 U.S.C. 154(b) by 214 days.

(21) Appl. No.: 16/016,452

(22) Filed: Jun. 22, 2018

Related U.S. Application Data

(63) Continuation-in-part of application No. 15/677,921, filed on Aug. 15, 2017.

(51) Int. Cl.
*H01M 2/34* (2006.01)
*H01M 10/04* (2006.01)
(52) U.S. Cl.
CPC ......... *H01M 2/34* (2013.01); *H01M 10/0436* (2013.01); *H01M 2200/00* (2013.01)
(58) Field of Classification Search
CPC .............................. H01M 2/34; H01M 10/0436
See application file for complete search history.

(56) References Cited

U.S. PATENT DOCUMENTS

| 6,027,326 | A | 2/2000 | Cesarano, III et al. |
| 6,231,625 | B1 * | 5/2001 | Lake ................... H01M 2/1094 |
| | | | 29/623.2 |
| 6,401,795 | B1 | 6/2002 | Cesarano, III et al. |
| 8,288,001 | B1 | 10/2012 | Fan et al. |
| 9,130,200 | B2 | 9/2015 | Dipietro et al. |
| 9,741,975 | B2 | 8/2017 | Laulicht et al. |
| 9,865,862 | B2 | 1/2018 | Ok |
| 10,058,881 | B1 | 8/2018 | Keicher et al. |

(Continued)

FOREIGN PATENT DOCUMENTS

| JP | 2017-126405 A | 7/2017 |
| JP | 2017-126420 A | 7/2017 |

(Continued)

OTHER PUBLICATIONS

U.S. Appl. No. 15/677,921, filed Aug. 15, 2017, Pozin et al.

(Continued)

*Primary Examiner* — Jimmy Vo
(74) *Attorney, Agent, or Firm* — Helen S. Baca; Kevin W. Bieg

(57) ABSTRACT

The present invention relates, in part, to methods of preparing a safety battery. Methods can include dispensing a safety ink formulation between the two poles of a battery. Upon exposure to moisture, the formulation provides an electrical connection between two poles, thus minimizing electrical discharge and/or reducing the formation of electrochemically generated ions at the pole(s).

21 Claims, 11 Drawing Sheets

(56) References Cited

U.S. PATENT DOCUMENTS

| | | | |
|---|---|---|---|
| 2006/0057286 A1* | 3/2006 | Gibbons | B05C 5/0225 427/207.1 |
| 2010/0310911 A1* | 12/2010 | Yamamoto | H01M 2/0212 429/94 |
| 2012/0244409 A1 | 9/2012 | Ok | |
| 2013/0202922 A1 | 8/2013 | DiPietro et al. | |
| 2014/0170074 A1 | 6/2014 | Ok | |
| 2016/0129634 A1 | 5/2016 | Keicher et al. | |
| 2017/0062829 A1 | 3/2017 | Ryu et al. | |
| 2017/0181291 A1 | 6/2017 | Bell et al. | |
| 2018/0062119 A1 | 3/2018 | Yagishita et al. | |
| 2018/0076467 A1 | 3/2018 | Boolish et al. | |

FOREIGN PATENT DOCUMENTS

| | | |
|---|---|---|
| JP | 2017-126421 A | 7/2017 |
| JP | 2017-126434 A | 7/2017 |
| JP | 2017-126435 A | 7/2017 |
| WO | WO 2013/106821 A1 | 7/2013 |
| WO | WO 2014/164098 A1 | 10/2014 |
| WO | WO 2017/122250 A1 | 7/2017 |

OTHER PUBLICATIONS

U.S. Appl. No. 16/016,466, filed Jun. 22, 2018, Pozin et al.

Commission of the European Communities, "Council Regulation (EC) No. 440/2008 of May 30, 2008 laying down test methods pursuant to Regulation (EC) No. 1907/2006 of the European Parliament and of the Council on the Registration, Evaluation, Authorisation and Restriction of Chemicals (REACH)," *Official J. European Union* L142, Part. A.6 (p. 57-66), May 31, 2008, (739 pp.).

European Chemicals Agency, "Guidance on information requirements and chemical safety assessment, Chapter R.7a: Endpoint specific guidance," *Version 6.0*, Helsinki, Finland, Jul. 2017 (610 pp.).

European Chemicals Agency, "Guidance on the biocidal products regulation, vol. I: Identity of the active substance/physico-chemical properties/analytical methodology—Information Requirements, Evaluation and Assessment. Parts A+B+C," *Version 2.0*, Helsinki, Finland, May 2018 (87 pp.).

Feng Q et al., "Leaching of copper from malachite with methanesulfonic acid," *Solvent Extraction Research and Development*, Japan 2015;22(2):159-168.

International Union of Pure and Applied Chemistry (IUPAC), "Nomenclature of Inorganic Chemistry," Second edition, Butterworth & Co. (Publishers) Ltd., London, England, 1971 (116 pp.).

Laulicht B et al., "Simple battery armor to protect against gastrointestinal injury from accidental ingestion," *Proceedings of the National Academy of Sciences of the United States of America* 2014;111(46):16490-16495.

Organisation for Economic Cooperation and Development (OECD), "Test No. 105: Water solubility," *OECD Guideline for the Testing of Chemicals*, adopted Jul. 27, 1995 (7 pp.).

Organisation for Economic Cooperation and Development (OECD) Environment Directorate: Joint Meeting of the Chemicals Committee and the Working Party on Chemicals, Pesticides and Biotechnology, "Guidance document on transformation/dissolution of metals and metal compounds in aqueous media," *OECD Series on Testing and Assessment*, No. 29, Jul. 23, 2001 (19 pp.).

Stassi S et al., "Spiky nanostructured metal particles as filler of polymeric composites showing tunable electrical conductivity," *Journal of Polymer Science, Part B: Polymer Physics* 2012;50:984-92.

U.S. Environmental Protection Agency, "Product Properties Test Guidelines—OPPTS 830.7840, Water Solubility: Column Elution Method, Shake Flask Method," *EPA 712-C-98-041*, Mar. 1998 (14 pp.).

U.S. Environmental Protection Agency, "Product Properties Test Guidelines—OPPTS 830.7860 Water Solubility (Generator Column Method)," *EPA 712-C-96-042*, Aug. 1996 (19 pp.).

International Search Report and Written Opinion for International Application No. PCT/US2018/045441 (14 pp.).

International Search Report and Written Opinion for International Application No. PCT/US2018/046581 (14 pp.).

\* cited by examiner

METHODS OF PREPARING A SAFETY BATTERY

CROSS-REFERENCE TO RELATED APPLICATION

This application is a continuation-in-part of prior application Ser. No. 15/677,921, filed Aug. 15, 2017, which is hereby incorporated by reference in its entirety.

STATEMENT OF GOVERNMENT INTEREST

This invention was made with Government support under Contract No. DE-NA0003525 awarded by the United States Department of Energy/National Nuclear Security Administration. This invention was made under a CRADA (SC03/1672) between the Procter & Gamble Company and Sandia National Laboratories, operated for the United States Department of Energy. The Duracell Company and its subsidiary Duracell U.S. Operations, Inc. are the successors-in-interest to the Procter & Gamble Company under CRADA (SC03/1672). The Government has certain rights in the invention.

FIELD OF THE INVENTION

The present invention relates, in part, to methods of preparing a safety battery. Methods can include dispensing a safety ink formulation between the two poles of a battery. Upon exposure to moisture, the formulation provides an electrical connection between two poles, thus minimizing electrical discharge and/or reducing the formation of electrochemically-generated ions at the pole(s).

BACKGROUND OF THE INVENTION

Ingestion of batteries can result in corrosive injuries, including esophageal burns, perforations, and fistulas. Upon ingestion, tissue fluids in proximity to the battery can be hydrolyzed, thereby resulting in electrochemically-generated hydroxide ions at the negative pole of the battery. These ions, in turn, can result in extensive tissue damage, especially if the battery is lodged within the esophagus and continues to locally generate high concentrations of hydroxide ions. Such injuries can be exacerbated when the patient is unable or unwilling to communicate when and if the ingestion occurred. Accordingly, there is a need for additional precautionary measures to mitigate the detrimental effects of battery ingestion-related injuries.

SUMMARY OF THE INVENTION

The present invention relates, in part, to methods of preparing a safety battery. In particular embodiments, we disclose methods to deposit a safety ink formulation (e.g., an ink, a paint, and/or other slurry-based materials) onto a surface of a battery (e.g., a coin cell battery). The formulation generally includes a reactive material (e.g., a metal reactant, such as any described herein) that becomes electrically conductive upon exposure to moisture. Furthermore, the formulation is typically deposited in physical proximity to the poles of the battery, such that the deposited formulation physically connects a negative pole (e.g., an anode of a coin cell battery) to the positive pole (e.g., a cathode of the coin cell battery). In one example, the anode and cathode of a coin cell are separated by a separated region (e.g., a spacer of about 0.5 mm in width) on the outer perimeter of the battery, and the formulation is dispensed within this region (e.g., by direct ink printing). The formulation can include any described herein.

In use, prior to exposure to moisture, the formulation displays minimal conductivity (electrical conductivity). When exposed to moisture, the formulation becomes electrically conductive. Its proximity to the negative and positive poles provides an electrical connection between the poles, thereby creating a short circuit and passivating the battery. In non-limiting embodiments, the formulation provides a negligible voltage difference before and after deposition of the safety ink formulation, as determined prior to exposure to moisture (e.g., a voltage difference of from about 0.5V or less). In other non-limiting embodiments, after exposure to moisture, the safety battery provides a voltage less than about 1.5 V.

Accordingly, in a first aspect, the present invention features a method of preparing a safety battery, the method including: providing a battery (e.g., on a stage, wherein the battery includes a negative pole, a positive pole, and a separated region configured to electrically separate the negative pole from the positive pole); and dispensing a safety ink formulation from a stationary dispenser, thereby providing a deposited (e.g., microdeposited) safety ink formulation on a surface of the battery (e.g., within the separated region and providing a physical connection between the negative pole and the positive pole). In particular embodiments, the safety ink formulation includes a metal reactant configured to form an electrical connection between the negative pole and the positive pole upon exposure to moisture.

In some embodiments, the dispensing step includes dispensing the safety ink formulation from the stationary dispenser while rotating the stage.

In some embodiments, the method further includes (e.g., after the dispensing step): spinning the battery including the microdeposited safety ink formulation, thereby displacing the formulation across a surface portion of the negative pole and/or the positive pole.

In some embodiments, the safety ink formulation has a viscosity of from about 100 cP to about 5000 cP.

In a second aspect, the present invention features a method of preparing a safety battery, the method including: providing a battery including a masked surface (e.g., wherein the battery includes a negative pole, a positive pole, and a separated region configured to electrically separate the negative pole from the positive pole, and wherein the masked surface includes a mask disposed on a surface portion of the negative pole); and dispensing a safety ink formulation onto the masked surface, thereby providing a deposited (e.g., microdeposited) safety ink formulation on an exposed surface of the battery in proximity to the masked surface (e.g., the exposed surface within the separated region and providing a physical connection between the negative pole and the positive pole). In some embodiments, the safety ink formulation (e.g., or deposited safety ink formulation) includes a metal reactant configured to form an electrical connection between the negative pole and the positive pole upon exposure to moisture.

In some embodiments, the dispensing step includes dispensing the safety ink formulation from a droplet dispenser or an aerosolized dispenser onto the masked surface and/or the exposed surface of the battery.

In other embodiments, the dispensing step includes adhering a thin film including the safety ink formulation onto the masked surface, and wherein the thin film is disposed on a removable backing layer. In further embodiments, the method can include removing the removable backing layer and/or the mask, thereby providing the thin film disposed on an exposed surface in proximity to the masked surface.

In some embodiments, the safety ink formulation has a viscosity of from about 1 cP to about 50 cP.

In further embodiments, the method includes removing the mask from the surface portion of the negative pole. In some embodiments, the removing step provides a deposited safety ink formulation disposed on the exposed surface of the battery (e.g., disposed within the separated region). In other embodiments, the removing step provides a deposited safety ink formulation, which in turn provides a physical connection between the negative pole and the positive pole of the battery.

In a third aspect, the present invention features a safety battery including: a negative pole; a positive pole separated from the negative pole by a separated region; and a microdeposited safety ink (e.g., including a metal reactant) configured to form an electrical connection between the negative pole and the positive pole upon exposure to moisture. In some embodiments, the microdeposited safety ink is disposed within the separated region, thereby providing a physical connection between the negative pole and the positive pole.

In some embodiments, the microdeposited safety ink has a dimension of from about 200 μm to about 1.0 mm (e.g., including ranges described herein) configured to provide the physical connection between the negative pole and the positive pole through the separated region.

In some embodiments, the metal reactant includes one or more metal salts. In other embodiments, the microdeposited safety ink further includes a reducing agent configured to reduce the one or more metal salts to provide a conductive agent that forms the electrical connection between the negative pole and the positive pole upon exposure to moisture In some embodiments, the microdeposited safety ink includes of from about 5 wt. % to about 95 wt. % of the one or more metal salts (e.g., a copper salt, or any described herein) and about 5 wt. % to about 95 wt. % of one or more polymers (e.g., a water permeable polymer, or any described herein).

In some embodiments, the microdeposited safety ink includes the metal reactant (e.g., a copper salt, or any described herein), one or more metal agents (e.g., any described herein), one or more polymers (e.g., a water permeable polymer, or any described herein), one or more optional reducing agents (e.g., a metal powder, or any described herein), one or more optional water-soluble salts (e.g., a water-soluble transition metal salt, or any described herein), one or more optional non-metal salts (e.g., a water-soluble non-metal salt, or any described herein), one or more optional additives (e.g., an adhesion promoter, a stabilizer, or any described herein), and one or more optional pigments.

In any embodiment herein, the metal reactant includes one or more metal salts (e.g., two or more metal salts). In other embodiments, the safety ink formulation (or a deposited safety ink formulation) includes a first metal reactant (e.g., a water-insoluble metal agent) and a second metal reactant (e.g., a water-soluble metal agent). In other embodiments, the safety ink formulation (or a deposited safety ink formulation) further includes a metal agent (e.g., a water-insoluble metal agent or a water-soluble metal agent).

In any embodiment herein, a safety ink formulation and/or a deposited safety ink further includes a reducing agent. In some embodiments, the reducing agent is configured to reduce the one or more metal salts to provide a conductive agent that forms the electrical connection between the negative pole and the positive pole upon exposure to moisture.

In any embodiment herein, a safety ink formulation and/or a deposited safety ink includes of from about 5 wt. % to about 95 wt. % of the one or more metal salts (e.g., any described herein) and about 5 wt. % to about 95 wt. % of one or more polymers (e.g., any described herein).

In any embodiment herein, a safety ink formulation and/or a deposited safety ink includes the metal reactant, one or more polymers, one or more optional reducing agents, one or more optional water-soluble salts, one or more optional non-metal salts, one or more optional additives, one or more optional pigments, and one or more optional solvents (e.g., any described herein).

In any embodiment herein, a safety ink formulation and/or a deposited safety ink includes of from about 5 wt. % to about 95 wt. % of the metal reactant (e.g., any described herein) and about 5 wt. % to about 95 wt. % of the one or more polymers (e.g., any described herein).

In any embodiment herein, a safety ink formulation and/or a deposited safety ink includes of from about 5 wt. % to about 95 wt. % of the metal reactant (e.g., any described herein), about 5 wt. % to about 95 wt. % of the one or more polymers (e.g., any described herein), and about 5 wt. % to about 95 wt. % of a metal agent (e.g., any described herein).

In any embodiment herein, a safety ink formulation and/or a deposited safety ink includes of from about 20 wt. % to about 95 wt. % of the metal reactant, about 5 wt. % to about 60 wt. % of the one or more polymers, about 20 wt. % to about 95 wt. % of the one or more reducing agents, 0 wt. % to about 95 wt. % of the one or more water-soluble salts, 0 wt. % to about 95 wt. % of a metal agent, 0 wt. % to about 95 wt. % of the one or more non-metal salts, 0 wt. % to about 5 wt. % of the one or more additives, and 0 wt. % to about 30 wt. % of the one or more pigments (e.g., any described herein).

Additional details follow.

Definitions

As used herein, the term "about" means+/−10% of any recited value. As used herein, this term modifies any recited value, range of values, or endpoints of one or more ranges.

By "micro" is meant having at least one dimension that is less than 1 mm and, optionally, equal to or larger than about 1 μm, unless otherwise specified. For instance, a microstructure (e.g., any structure described herein) can have a length, width, height, cross-sectional dimension, circumference, radius (e.g., external or internal radius), or diameter that is less than 1 mm.

By "nano" is meant having at least one dimension that is less than 1 μm but equal to or larger than about 1 nm. For instance, a nanostructure (e.g., any structure described herein, such as a nanoparticle) can have a length, width, height, cross-sectional dimension, circumference, radius (e.g., external or internal radius), or diameter that is less than 1 μm but equal to or larger than 1 nm. In other instances, the nanostructure has a dimension that is of from about 1 nm to about 1 μm.

By "subject" is meant a human or non-human animal (e.g., a mammal).

By "salt" is meant an ionic form of a compound or structure (e.g., any agent or composition described herein), which includes a cation or anion compound to form an electrically neutral compound or structure. Salts (e.g., simple salts having binary compounds, double salts, triple salts, etc.) are well known in the art. For example, salts are described in Berge S M et al., "Pharmaceutical salts," *J. Pharm. Sci.* 1977 January; 66(1):1-19; International Union of Pure and Applied Chemistry, "Nomenclature of Inorganic Chemistry," Butterworth & Co. (Publishers) Ltd., London, England, 1971 (2nd ed.); and in "Handbook of Pharmaceutical Salts: Properties, Selection, and Use," Wiley-VCH, April 2011 (2nd rev. ed., eds. P. H. Stahl and C. G. Wermuth). The salts can be prepared in situ during the final isolation and purification of the compounds of the invention or separately by reacting the free base group with a suitable organic acid (thereby producing an anionic salt) or by reacting the acid group with a suitable metal or organic salt (thereby producing a cationic salt). Representative anionic salts include acetate, adipate, alginate, ascorbate, aspartate, benzenesulfonate, benzoate, bicarbonate, bisulfate, bitartrate, borate, bromide, butyrate, camphorate, camphorsulfonate, chloride, citrate, cyclopentanepropionate, digluconate, dihydrochloride, diphosphate, dodecylsulfate, edetate, ethanesulfonate, fumarate, glucoheptonate, glucomate, glutamate, glycerophosphate, hemisulfate, heptonate, hexanoate, hydrobromide, hydrochloride, hydroiodide, hydroxides, hydroxyethanesulfonate, hydroxynaphthoate, iodide, lactate, lactobionate, laurate, lauryl sulfate, malate, maleate, malonate, mandelate, mesylate, methanesulfonate, methylbromide, methylnitrate, methylsulfate, mucate, 2-naphthalenesulfonate, nicotinate, nitrate, oleate, oxalate, palmitate, pamoate, pectinate, persulfate, 3-phenylpropionate, phosphate, picrate, pivalate, polygalacturonate, propionate, salicylate, stearate, subacetate, succinate, sulfate, tannate, tartrate, theophyllinate, thiocyanate, triethiodide, toluenesulfonate, undecanoate, valerate salts, hydrates thereof, basic salts thereof (hydroxide salts, oxide salts), combinations thereof, and the like. Representative cationic salts include metal salts, such as alkali or alkaline earth salts, e.g., barium, calcium (e.g., calcium edetate), lithium, magnesium, potassium, sodium, and the like; other metal salts, such as aluminum, bismuth, iron, and zinc; as well as nontoxic ammonium, quaternary ammonium, and amine cations, including, but not limited to ammonium, tetramethylammonium, tetraethylammonium, methylamine, dimethylamine, trimethylamine, triethylamine, ethylamine, pyridinium, and the like. Other cationic salts include organic salts, such as chloroprocaine, choline, dibenzylethylenediamine, diethanolamine, ethylenediamine, methylglucamine, and procaine. Exemplary salts include pharmaceutically acceptable salts.

By "pharmaceutically acceptable salt" is meant a salt that is, within the scope of sound medical judgment, suitable for use in contact with the tissues of humans and animals without undue toxicity, irritation, allergic response and the like and are commensurate with a reasonable benefit/risk ratio.

By "pharmaceutically acceptable excipient" is meant any ingredient other than a compound or structure (e.g., any agent or composition described herein) and having the properties of being nontoxic and non-inflammatory in a subject. Exemplary, non-limiting excipients include adjuvants, antiadherents, antioxidants, binders, carriers, coatings, compression aids, diluents, disintegrants, dispersing agents, dyes (colors), emollients, emulsifiers, fillers (diluents), film formers or coatings, flavors, fragrances, glidants (flow enhancers), isotonic carriers, lubricants, preservatives, printing inks, solvents, sorbents, stabilizers, suspensing or dispersing agents, surfactants, sweeteners, waters of hydration, or wetting agents. Any of the excipients can be selected from those approved, for example, by the United States Food and Drug Administration or other governmental agency as being acceptable for use in humans or domestic animals. Exemplary excipients include, but are not limited to alcohol, butylated hydroxytoluene (BHT), calcium carbonate, calcium phosphate (dibasic), calcium stearate, croscarmellose, cross-linked polyvinyl pyrrolidone, citric acid, crospovidone, cysteine, ethylcellulose, gelatin, glycerol, hydroxypropyl cellulose, hydroxypropyl methylcellulose, lactated Ringer's solution, lactose, magnesium stearate, maltitol, maltose, mannitol, methionine, methylcellulose, methyl paraben, microcrystalline cellulose, polyethylene glycol, polyol, polyvinyl pyrrolidone, povidone, pregelatinized starch, propyl paraben, retinyl palmitate, Ringer's solution, shellac, silicon dioxide, sodium carboxymethyl cellulose, sodium chloride injection, sodium citrate, sodium starch glycolate, sorbitol, starch (corn), stearic acid, stearic acid, sucrose, talc, titanium dioxide, vegetable oil, vitamin A, vitamin E, vitamin C, water, and xylitol.

By "solvate" is meant a stabilized form of a compound or structure (e.g., any formulas, compounds, or compositions described herein, including anionic or cationic forms thereof) with one or more solvent molecules. Such forms can be stabilized by any useful interaction, such as electrostatic forces, van der Waals forces, or hydrogen bond formation. Exemplary solvates include hydrates (including one or more water molecules). As used herein, the terms "top," "bottom," "upper," "lower," "above," and "below" are used to provide a relative relationship between structures. The use of these terms does not indicate or require that a particular structure must be located at a particular location in the component.

Other features and advantages of the invention will be apparent from the following description and the claims.

DETAILED DESCRIPTION OF THE INVENTION

The present invention relates, in part, to methods of preparing a safety battery. In general, the structure of an electric battery includes an electrochemical cell, a negative pole, and a positive pole. When a battery is exposed to moisture or an aqueous environment, electrolysis of water can occur at the negative pole. Accordingly, in one non-limiting embodiment, the present invention relates to methods of preparing a safety battery that, upon exposure to moisture or an aqueous environment, provides a reduced electrical potential to minimize electrolysis of environmental water. Such reductions can be achieved by short circuiting the battery, e.g., by employing a safety ink formulation deposited between the positive and negative poles, in which the formulation is non-conductive prior to exposure but becomes conductive when exposed to moisture.

Figure 1A:
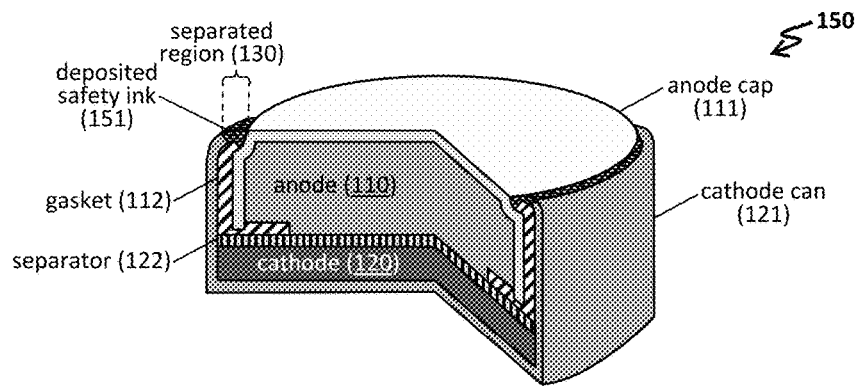
FIG. 1A-1C shows exemplary safety batteries including a microdeposited safety ink. Provided are (A) a schematic of an exemplary safety battery 150; (B) an image of a prototype safety battery including printed safety ink deposited in the separated region between the anode cap and the cathode can; and (C) a non-limiting schematic of an exemplary ink formulation including a metal reactant 14 and a reducing agent 13 dispersed in a polymer 12.

FIG. 1A provides a schematic of an exemplary safety battery 150 including a negative pole (e.g., an anode) and a positive pole (e.g., a cathode). Provided is a representative button cell but other battery types can be employed (e.g., any described herein). As can be seen, the safety battery includes an anode cap 111 electrically connected to an anode 110, a cathode can 121 electrically connected to a cathode 120, and a separator 122 that separates the anode from the cathode. An insulating gasket 112 preserves the internal components of the battery (e.g., maintains the chemical composition of the anode and cathode) and physically separates the negative and positive poles (e.g., insulates the anode cap from the cathode can). A separated region 130 is disposed above the insulating gasket 112 and between the edges of the anode cap 111 and the cathode can 121.

As seen in FIG. 1A, the exemplary safety battery 150 also includes a deposited safety ink 151 within the separated region 130 (e.g., a microdeposited safety ink formed by dispensing any safety ink formulation described herein). The deposited safety ink 151 can possess any useful chemical and physical features that facilitate the formation of an electrical connection between the negative pole and the positive pole upon exposure to moisture. For instance, the deposited safety ink can include one or more chemical agents (e.g., metal reactant(s)) that become more conductive upon exposure to moisture. In another instance, to facilitate deposition onto a surface, the formulation can include one or more polymers that provide a matrix in which the agents can be dispersed. Optionally, the polymer can be hygroscopic or water permeable, thereby allowing water vapor or liquid water to access the chemical agents.

Figure 1B:
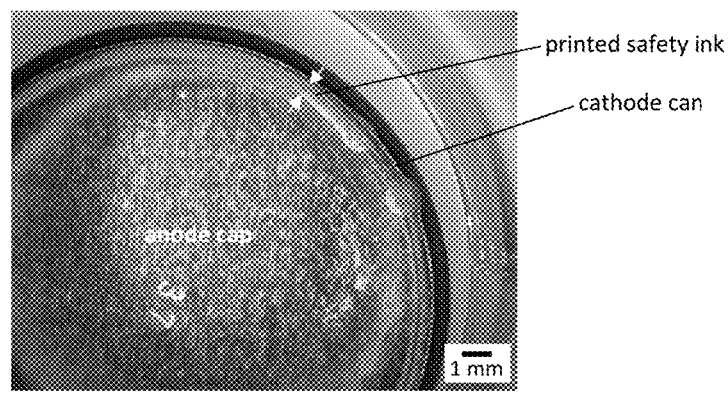

The formulation can be deposited within any useful region of the battery, e.g., between the negative and positive poles, thereby providing a physical connection between these poles. FIG. 1B provides an image of an exemplary safety battery having a printed safety ink located between the anode cap and the cathode can, in which the spacing between the anode cap and cathode can is about 500 μm or any range described herein.

The formulation can include any useful agents (e.g., any described herein, such as metal agent(s), metal reactant(s), metal salt(s), metal reducing agent(s), metal powder(s), reducing agent(s), polymer(s), water-soluble salt(s), non-metal salt(s), additive(s), pigment(s), excipient(s), and/or solvent(s)). In one instance, the deposited formulation forms a safety ink, which is a composite including one or more agents. The formulation and/or ink can include one or more metal reactants, e.g., metal salt(s), that are disposed within a polymeric matrix, thereby forming a composite that is relatively non-conductive prior to exposure to water and becomes increasingly conductive upon exposure to water. As used herein, "water" or "moisture" can include liquid water, water vapor, moisture, relative humidity (RH) greater than about 65% (e.g., about 70%, 75%, 80%, 85%, 90%, 95%, or greater), or an aqueous environment (e.g., including exposure to water, a buffer, Ringer's solution, simulated tissue fluid, biological fluid(s) such as saliva or stomach fluid, tissue fluid, etc.). In one non-limiting embodiment, the exposure-stimulated conductivity provides an average measured potential of less than about 1.2V within at least about 1200 seconds.

Figure 1C:
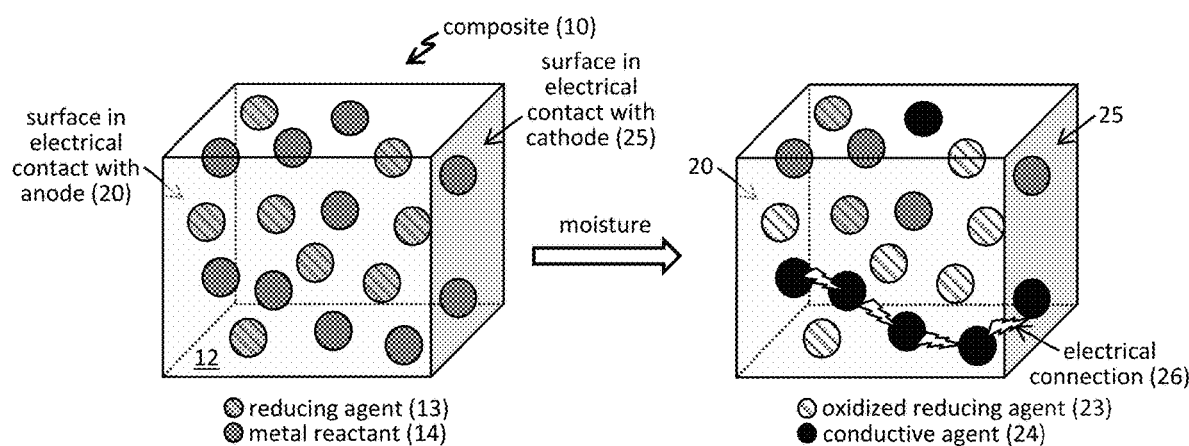

FIG. 1C provides a schematic of an exemplary composite (e.g., microdeposited safety ink) formed from a safety ink formulation. As can be seen, the composite 10 has a first surface 20 in electrical contact with an anode (or negative pole) of a battery and a second surface 25 in electrical contact with a cathode (or positive pole) of a battery. The composite 10 includes a polymer 12 forming a matrix, in which metal reactants 14 and other agents (e.g., reducing agents 13) can be dispersed within the matrix. Prior to exposure to water, the composite is relatively non-conductive, in which the dispersed agents are relatively unreactive. Upon exposure to water, one or more of the dispersed agents react with the present water molecules, thereby ultimately forming an electrical connection 26 (e.g., an indirect electrical connection) between the anode and the cathode that forms a short circuit.

Any useful reaction can provide an electrical connection. As seen in FIG. 1C, one non-limiting reaction includes a metal reactant 14 that forms a conductive agent 24 upon exposure to water. In one non-limiting instance, the metal reactant is a metal salt (e.g., $CuSO_4$), which is soluble in water.

The metal reactant can be in proximity to other agents that facilitate the conversion of the metal reactant to a conductive agent. In one non-limiting instance, the other agent can be a reducing agent. As seen in FIG. 1C, the composite 10 includes metal reactants 14 and reducing agents 13. If the metal reactant is a metal salt, then the reducing agent can aid in reducing the metal salt to form a more conductive elemental metal. For instance, if the metal reactant is a metal salt (e.g., $CuSO_4$), then the presence of water will result in the formation of a metal cation (e.g., $Cu^{2+}$). This metal cation, in turn, can be readily reduced in the presence of a reducing agent (e.g., $Zn(O)$), thereby resulting in the formation of an oxidized reducing agent 23 (e.g., $Zn^{2+}$) and a conductive agent 24 (e.g., $Cu(0)$).

When provided at sufficient concentrations within the composite, the conductive agent forms an electrical path through the matrix, thereby resulting in an electrical connection 26 between the anode and the cathode. For instance, if the metal reactant includes $CuSO_4$, this salt reacts with water to form cationic salt $Cu^{2+}$, which can then be reduced to form $Cu(0)$. Within the polymer matrix, $Cu(0)$ can form dendrites to provide a conductive path between the two poles.

Figure 2A:
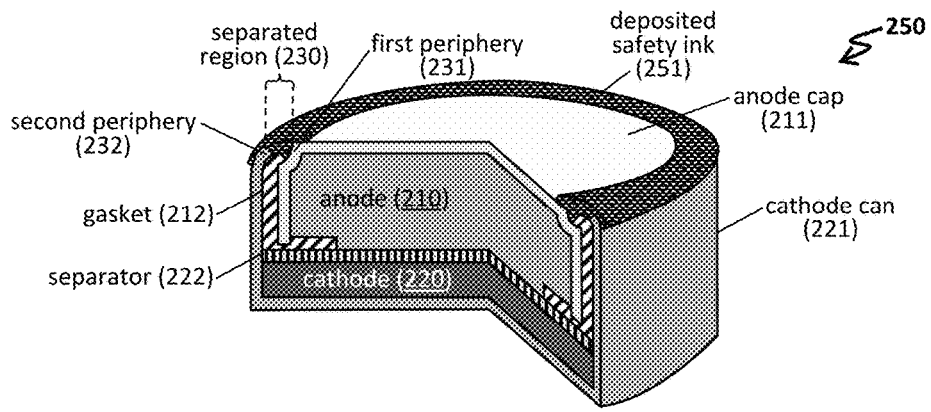
FIG. 2A-2C shows further exemplary safety batteries including a microdeposited safety ink. Provided are (A) a schematic of an exemplary safety battery 250; (B) an image of a prototype safety battery including printed safety ink; and (C) an image of another prototype safety battery including printed, spin-coated safety ink.

The deposited safety ink can be provided in any useful manner. In one non-limiting instance, the deposited safety ink provides a composite within the separated region. In another non-limiting instance, the deposited safety ink extends past the separated region and is further disposed on a surface portion of the negative pole (e.g., a surface portion of an anode cap) and/or on an extended surface portion of the positive pole (e.g., a surface portion of a cathode can). As can be seen in FIG. 2A, the exemplary safety battery 250 can include a deposited safety ink 251 within the separated region 230 and between the first periphery 231 (of a negative pole) and the second periphery 232 (of a positive pole). The safety battery also includes an anode cap 211 electrically connected to an anode 210, a cathode can 221 electrically connected to a cathode 220, a separator 222, and an insulating gasket 212.

Figure 2B:
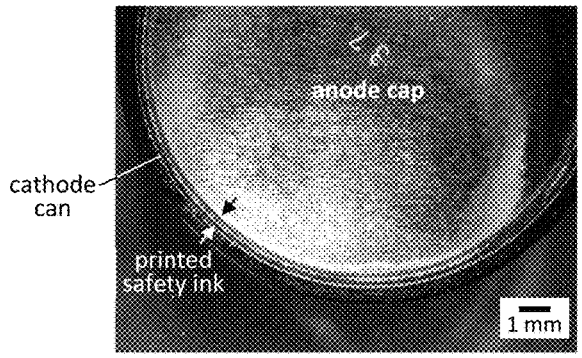
Figure 2C:
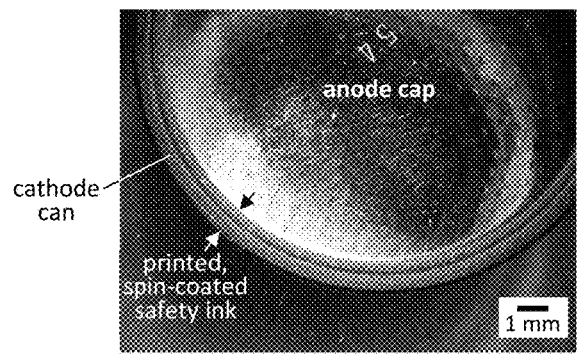

As can be seen, the deposited safety ink 251 extends past the first periphery 231 and on to a surface portion of the negative pole (e.g., on to a surface portion of the anode cap 211). the deposited safety ink 251 also extends past the second periphery 232 and on to a surface portion of the positive pole (e.g., on to a surface portion of the cathode can 221). Extending the deposited safety ink past the separated region can be useful, e.g., to maximize the contact region between the composite and the poles of the battery, which can provide stable adhesion between the composite and the battery; to increase the local concentration or number of metal reactants in proximity to the poles; and/or to provide a composite having a thin, uniform profile. Provided are images of an exemplary safety battery including a printed safety ink, in which an ink formulation was directly dispensed within the separated region of the battery (FIG. 2B); as well as another exemplary safety battery including a printed safety ink, in which an ink formulation was directly dispensed within the separated region of the battery, and then the battery was spun to provide an extended (e.g., spin-coated), printed safety ink (FIG. 2C).

Any useful fabrication methods can be implemented to provide any deposited safety ink or composite described herein. For instance, the method can include dispensing a safety ink formulation within a separated region of a battery by any useful manner. Dispensing can include direct writing (or direct printing), aerosol printing, jet printing, contact printing, dip coating, flexographic printing, pad printing, gravure printing, or sticker application of a safety ink formulation (e.g., any described herein).

FIG. 3A-3D provides a non-limiting, exemplary method for preparing a safety battery by way of using a microdispenser 335 to provide a safety ink formulation 330 to a surface portion of a battery. The exemplary method can include a step of providing 300 a battery on a stage (e.g., a rotating stage 340). As can be seen, the battery can include a negative pole (e.g., an anode cap 311), a positive pole (e.g., a cathode can 321), and a separated region 315 configured to electrically separate the negative pole from the positive pole. Next, the method can include dispensing 350 a safety ink formulation 330 from a dispenser (e.g., a stationary dispenser, such as a stationary microdispenser 335). Dispensing the formulation can provide a deposited formulation (e.g., a microdeposited safety ink formulation or a printed safety ink 351), which in turn provides a physical connection (e.g., a connected region 355) between the negative and positive poles. In particular non-limiting embodiments, during dispensing, the dispenser remains stationary, while the stage 340 is rotated 345. In yet other non-limiting embodiments, during dispensing, the dispenser is rotated, while the stage remains stationary. Such configurations can be optimized to improve accuracy (e.g., improved accuracy in deposition occurring at a desired location), enhanced uniformity (e.g., in deposition location, deposited thickness or height, etc.), increased throughput, and/or minimized consumption of the formulation. In some embodiments, rotating the stage can provide simplified unit operation of deposition (e.g., positioning the battery on the optimal location of the stage, rotating the stage, and dispensing the formulation from a stationary dispenser).

Figure 3A:
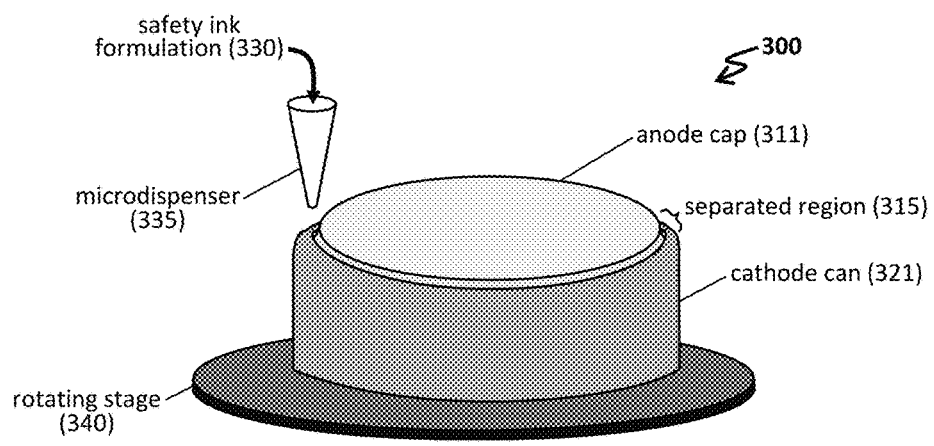
FIG. 3A-3D shows an exemplary method for preparing a safety battery using a stationary dispenser. Provided are schematics showing non-limiting steps of (A) providing 300 a battery; (B) dispensing 350 a safety ink formulation; (C) spinning 360 a battery having a microdeposited safety ink formulation; and (D) providing a battery 370 having a printed, spin-coated safety ink formulation.
Figure 3B:
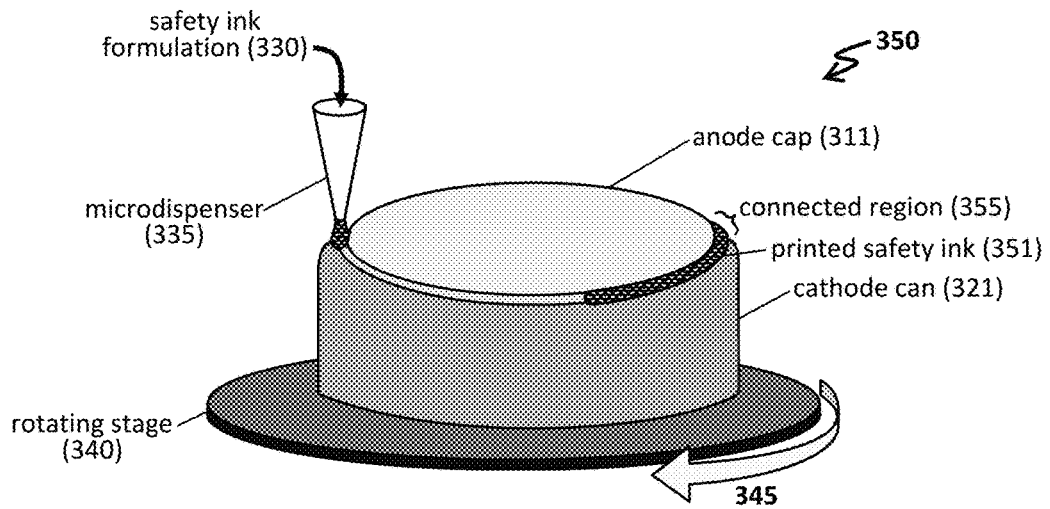
Figure 3C:
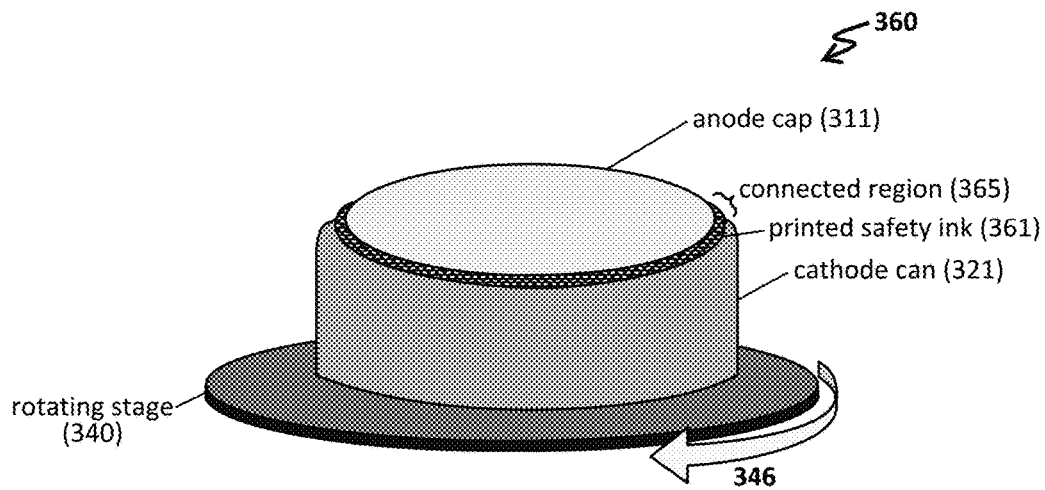

The dispensed formulation can extend along a portion of the battery's periphery or extend along the entire battery's periphery, thereby providing a continuous microdeposited formulation along a surface portion of the battery. As seen in FIG. 3C, the method can include providing 360 a safety battery including a printed safety ink 361 that extends along the battery's periphery, in which the connected region 365 provides a physical connection within the entire separated region between the negative and positive poles.

Figure 3D:
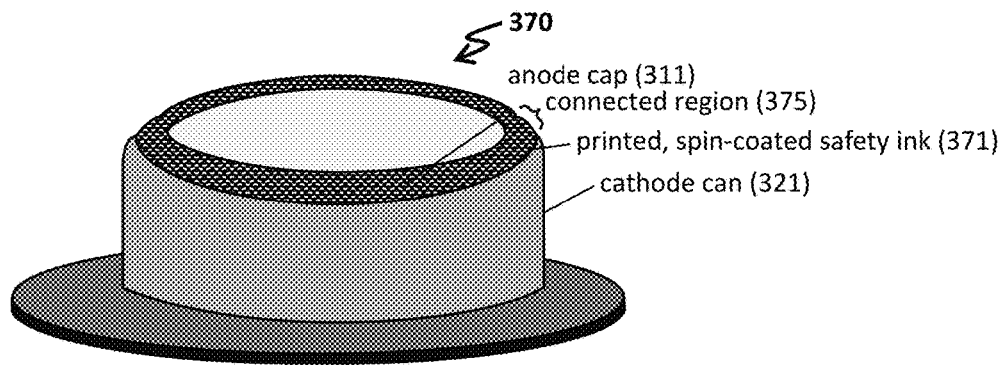

After dispensing, further step(s) can be implemented to modify the dispensed formulation. In one non-limiting instance, as seen in FIG. 3C, the method includes spinning 346 the battery including the deposited formulation to displace the dispensed formulation. As seen in FIG. 3D, the resulting battery 370 includes a printed, spin-coated safety ink 371 that provides a connected region 375 that extends beyond the periphery of the anode cap 311 and the cathode can 321.

Prior to dispensing the safety ink formulation, one or more additional layers or patterns can be disposed on a surface portion of the battery. In one non-limiting instance, the method can include depositing one or more metal agents (e.g., a pattern or a layer) on a surface portion of the negative pole prior to depositing the safety ink formulation. Accordingly, in one instance, the safety battery can include a metal layer or a metal pattern disposed between a surface portion of the negative pole and the deposited formulation. In another instance, the safety battery can include a metal layer or a metal pattern disposed within the separated region and between a surface portion of the negative pole and the deposited formulation. The metal layer or metal pattern can include any useful metal, for example and without limitation, any of the following: bismuth (Bi, including Bi(0)), indium (In, including In(0)), lead (Pb, including Pb(0)), mercury (Hg, including Hg(0)), tin (Sn, including Sn(0)), zinc (Zn, including Zn(0)), alloys thereof, and any combinations thereof.

Figure 4:
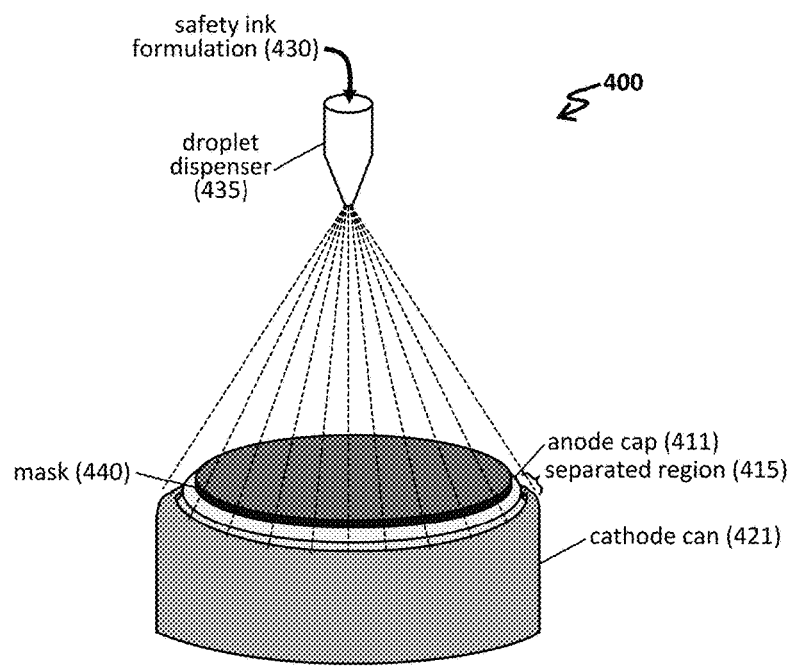
FIG. 4 shows another exemplary method 400 for preparing a safety battery using an aerosolized dispenser.

Other dispensing methods can be employed with the safety ink formulations described herein. In one non-limiting instance, the method can include dispensing a safety ink formulation from a droplet dispenser or an aerosolized dispenser. The droplet or aerosolized dispenser may have sufficient resolution to print in proximity to the separated region. Alternatively, selective printing can be enhanced by employing a mask to selectively block deposition. Thus, in another non-limiting instance, as seen in FIG. 4, the method can include dispensing 400 the formulation 430 from a droplet dispenser 435 onto the masked surface, which includes a mask 440 disposed on a surface portion of the battery (e.g., a surface portion of the negative pole, such as the anode cap 411) to provide access to the separated region 415 (e.g., while minimizing deposition to other portions of the poles, such as the central portion of the anode cap 411 or the vertical body of the cathode can 421). Exemplary droplet and aerosol dispenser include, e.g., hydrodynamic printing, ink jet printing, electrohydrodynamic printing, spray painting (e.g., employing an aerosolized, pressurized system), droplet-on-demand printing (DOD printing, e.g., piezoelectric DOD technology and thermal DOD technology), atomizer printing (e.g., airless pressure atomizers), airspray printing, etc.

Figure 5A:
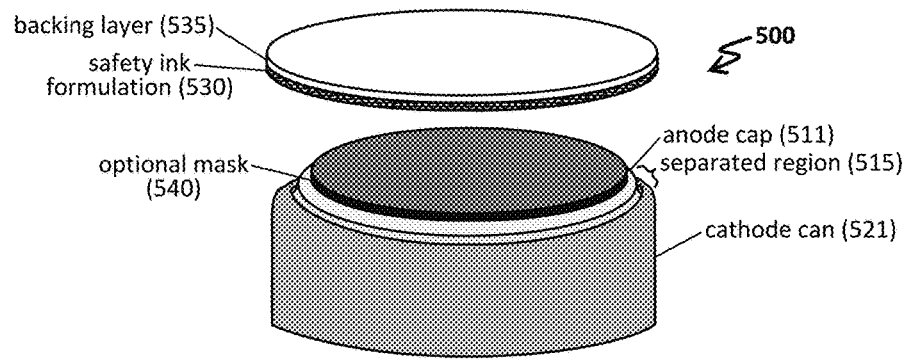
FIG. 5A-5B shows (A) yet another exemplary method 500 for preparing a safety battery using a thin film of the safety ink formulation 430. Also provided are (B) exemplary thin film structures (e.g., stickers 550, 560), including a planar thin film (left) and a patterned thin film (right).

Another dispensing method can include use of a pre-printed thin film, which can be affixed to a surface portion of the battery. In one non-limiting instance, such pre-printed films could be affixed manually. Furthermore, the thin film of the formulation can be provided on a sacrificial backing layer, in which the backing layer can be used to align the thin film to the battery, apply pressure to the battery in order affix the film, and then removed. FIG. 5A provides an exemplary step of adhering 500 (or affixing) a thin film including the safety ink formulation onto a surface portion of the battery. In some embodiments, the surface portion of the battery includes a masked surface, thereby allowing the formulation to be affixed to the exposed, unmasked portions of the battery. The optional mask 540 can be aligned on the battery to expose the separate region 515 between the anode cap 511 and the cathode can 521. In some non-limiting embodiments, the thin film of the formulation 530 is disposed on a removable backing layer 535.

Figure 5B:
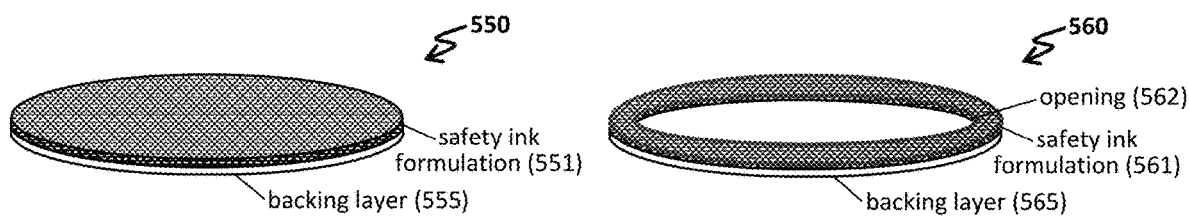

The thin film can be configured in any useful manner. The thin film can include a formulation disposed on a backing layer that can be removed. Optionally, the thin film can be disposed between a backing layer and a liner, in which the liner is removed to expose a first surface of the thin film to be affixed to the battery and the backing layer is removed to expose a second surface of the thin film to be exposed to the environment. An exemplary step for dispensing the formulation can include removing a liner from a thin film to expose a first surface of the thin film; adhering the first surface of the thin film onto a surface portion of the battery; removing a backing layer from the thin film, thereby exposing a second surface of the thin film to the environment; and optionally removing the mask from a surface portion, if the mask is present. The thin film can include an adhesive disposed between the formulation and the backing layer; or between the formulation and the liner. Optionally, the formulation itself can be optimized to provide sufficient adhesion to the battery's surface. The thin film can be patterned in any useful manner. In one instance, as in FIG. 5B (left), an exemplary sticker 550 includes a thin film 551 composed from a formulation, in which the thin film is disposed on a backing layer 555. As can be seen, the formulation extends across most of the surface of the backing layer. In another instance, as in FIG. 5B (right), another exemplary sticker 560 includes a thin film 561 disposed on a backing layer 565, but the thin film is patterned to include an opening 562. This patterned sticker can be employed to align the thin film along the periphery of a coin cell battery, while minimizing use of the formulation within the central portion of the anode cap.

After dispensing the formulation, the safety battery can be further treated. For instance, the safety battery including the microdeposited formulation can be dried, tested, sterilized, cured, polymerized, heat or UV treated, cleaned, sintered, and/or packaged.

The deposited formulation (e.g., microdeposited safety ink formulation, printed safety ink, composite, deposited composite, composite layer, continuous bead of formulation, etc.) can have any useful characteristic. In one non-limiting embodiment, the deposited formulation (e.g., printed safety ink) has a dimension (e.g., width corresponding to the separated region between the two poles of a battery) of from about 30 µm to about 2000 µm (e.g., 30 µm to 100 µm, 30 µm to 200 µm, 30 µm to 300 µm, 30 µm to 400 µm, 30 µm to 500 µm, 30 µm to 600 µm, 30 µm to 700 µm, 30 µm to 800 µm, 30 µm to 900 µm, 30 µm to 1000 µm, 30 µm to 1500 µm, 50 µm to 100 µm, 50 µm to 200 µm, 50 µm to 300 µm, 50 µm to 400 µm, 50 µm to 500 µm, 50 µm to 600 µm, 50 µm to 700 µm, 50 µm to 800 µm, 50 µm to 900 µm, 50 µm to 1000 µm, 50 µm to 1500 µm, 50 µm to 2000 µm, 75 µm to 200 µm, 75 µm to 300 µm, 75 µm to 400 µm, 75 µm to 500 µm, 75 µm to 600 µm, 75 µm to 700 µm, 75 µm to 800 µm, 75 µm to 900 µm, 75 µm to 1000 µm, 75 µm to 1500 µm, 75 µm to 2000 µm, 100 µm to 200 µm, 100 µm to 300 µm, 100 µm to 400 µm, 100 µm to 500 µm, 100 µm to 600 µm, 100 µm to 700 µm, 100 µm to 800 µm, 100 µm to 900 µm, 100 µm to 1000 µm, 100 µm to 1500 µm, 100 µm to 2000 µm, 200 µm to 300 µm, 200 µm to 400 µm, 200 µm to 500 µm, 200 µm to 600 µm, 200 µm to 700 µm, 200 µm to 800 µm, 200 µm to 900 µm, 200 µm to 1000 µm, 200 µm to 1500 µm, 200 µm to 2000 µm, 300 µm to 400 µm, 300 µm to 500 µm, 300 µm to 600 µm, 300 µm to 700 µm, 300 µm to 800 µm, 300 µm to 900 µm, 300 µm to 1000 µm, 300 µm to 1500 µm, 300 µm to 2000 µm, 400 µm to 500 µm, 400 µm to 600 µm, 400 µm to 700 µm, 400 µm to 800 µm, 400 µm to 900 µm, 400 µm to 1000 µm, 400 µm to 1500 µm, 400 µm to 2000 µm, 450 µm to 500 µm, 450 µm to 600 µm, 450 µm to 700 µm, 450 µm to 800 µm, 450 µm to 900 µm, 450 µm to 1000 µm, 450 µm to 1500 µm, 450 µm to 2000 µm, 500 µm to 600 µm, 500 µm to 700 µm, 500 µm to 800 µm, 500 µm to 900 µm, 500 µm to 1000 µm, 500 µm to 1500 µm, 500 µm to 2000 µm, 550 µm to 600 µm, 550 µm to 700 µm, 550 µm to 800 µm, 550 µm to 900 µm, 550 µm to 1000 µm, 550 µm to 1500 µm, 550 µm to 2000 µm, 600 µm to 700 µm, 600 µm to 800 µm, 600 µm to 900 µm, 600 µm to 1000 µm, 600 µm to 1500 µm, 600 µm to 2000 µm, 650 µm to 700 µm, 650 µm to 800 µm, 650 µm to 900 µm, 650 µm to 1000 µm, 650 µm to 1500 µm, 650 µm to 2000 µm, 700 µm to 800 µm, 700 µm to 900 µm, 700 µm to 1000 µm, 700 µm to 1500 µm, 700 µm to 2000 µm, 750 µm to 800 µm, 750 µm to 900 µm, 750 µm to 1000 µm, 750 µm to 1500 µm, 750 µm to 2000 µm, 800 µm to 900 µm, 800 µm to 1000 µm, 800 µm to 1500 µm, 800 µm to 2000 µm, 850 µm to 900 µm, 850 µm to 1000 µm, 850 µm to 1500 µm, 850 µm to 2000 µm, 900 µm to 1000 µm, 900 µm to 1500 µm, 900 µm to 2000 µm, 950 µm to 1000 µm, 950 µm to 1500 µm, or 950 µm to 2000 µm) and/or is disposed on an outer periphery of the battery. Similarly, the separated region between the anode (or a surface that is in electrical contact with the anode, e.g., the anode cap of a coin cell) and the cathode (or a surface that is in electrical contact with the cathode, e.g., the cathode can of a coin cell) can be of from about 30 µm to about 1000 µm (e.g., including any ranges disclosed herein). Accordingly, the deposited formulation can be disposed within the separated region or above the gap between the negative and positive poles, in which the separated region or the gap can have a thickness of from about 30 µm to about 1000 µm (e.g., including any ranges disclosed herein). In yet other embodiments, the safety battery and/or the deposited formulation are biologically inert.

In other embodiments, the deposited formulation contacts a portion of the anode cap and/or a portion of the cathode can, in which contact with one of the battery poles can be sufficient. The deposited formulation can provide a physical connection between the two poles of the battery. Alternatively, the deposited formulation can provide a physical connection to a surface portion of only one of the poles (e.g., in which another surface portion of the battery can serve as a contact pad to establish an electrical connection between the conductive agent and the other battery pole).

The deposited formulation can be disposed on any useful surface of a battery (e.g., between the gap or within the separated region of the negative and positive poles). Furthermore, the deposited formulation can be provided as a planar layer, a continuous layer, a continuous line, a patterned layer, a periodic pattern, or a pattern of beads, as well as combinations thereof (e.g. a first pattern of one component (e.g., a first pattern of beads including a reducing agent, a metal salt, a polymer, and/or an additive) with a continuous line or layer of another component (e.g., a metal agent, a polymer, and/or an additive) disposed on top of the first pattern). In one non-limiting instance, the deposited formulation can include a continuous layer disposed along and preferably in contact with a periphery of the negative pole and/or preferably in contact with a periphery of the positive pole. Alternatively, the deposited formulation need not be continuous but may be periodically positioned (e.g., deposited, layered, etc.), for example deposited as discrete dots.

The deposited formulation can be used in conjunction with another layer or pattern of a second formulation. For instance, the deposited formulation can include a first formulation including a first metal agent (e.g., any formulation or agent described herein), and another second formulation can be dispensed in proximity to the first formulation. This second formulation can be provided in any useful layer or pattern. In one non-limiting embodiment, a second formulation can be used to deposit (e.g., print) a pattern of an agent useful for suppressing hydrogen bubbling during metal dendrite growth (e.g., an agent such as a reducing agent, including Zn metal). Thus, one exemplary safety battery can include a deposited formulation including a polymer and a metal agent (e.g., a metal salt and/or a metal powder), and underlying this deposited layer is a pattern including a second formulation (e.g., a pattern of dots along a surface portion of the negative pole, where the dots include a reducing agent and/or a metal powder; or a pattern including a layer disposed upon a surface portion of the negative pole, where the layer includes a reducing agent and/or a metal powder). In this manner, hierarchical structures can be patterned by employing different formulations to print different layers on a surface portion of the battery. In one instance, the pattern includes Zn, which locally increases the hydrogen overvoltage and thereby advantageously suppresses hydrogen bubbling at the specific location(s) where a Zn dot or layer was deposited. Non-limiting metal agents having reasonably high overvoltage of hydrogen evolution (in comparison with hydrogen overvoltage of material of negative electrode, typically Ni or stainless steel) include tin (Sn), indium (In), bismuth (Bi), lead (Pb), zinc (Zn), and mercury (Hg), in which each can alternatively be used alone or in combination to suppress hydrogen bubbling and promote formation of a metallic dendrite (or an electrical connection including such dendrites) between the negative and positive poles. Further non-limiting metal agents can include bismuth (0) (Bi), indium (0) (In), lead (0) (Pb), mercury (0) (Hg), tin (0) (Sn), zinc (0) (Zn), alloys thereof, and any combinations thereof.

Furthermore, the microdeposited formulation can cover at least about 10% (e.g., at least about 20%, 30%, 40%, 50%, 60%, 70%, 80%, 90%, or 100%) or from about 10% to about 100% (e.g., from about 10% to 25%, 10% to 50%, 10% to 75%, 10% to 90%, 10% to 95%, 10% to 98%, 10% to 99%, 20% to 25%, 20% to 50%, 20% to 75%, 20% to 90%, 20% to 95%, 20% to 98%, 20% to 99%, 20% to 100%, 30% to 50%, 30% to 75%, 30% to 90%, 30% to 95%, 30% to 98%, 30% to 99%, 30% to 100%, 40% to 50%, 40% to 75%, 40% to 90%, 40% to 95%, 40% to 98%, 40% to 99%, 40% to 100%, 50% to 75%, 50% to 90%, 50% to 95%, 50% to 98%, 50% to 99%, 50% to 100%, 60% to 75%, 60% to 90%, 60% to 95%, 60% to 98%, 60% to 99%, 60% to 100%, 70% to 75%, 70% to 90%, 70% to 95%, 70% to 98%, 70% to 99%, 70% to 100%, 80% to 90%, 80% to 95%, 80% to 98%, 80% to 99%, 80% to 100%, 90% to 95%, 90% to 98%, 90% to 99%, 90% to 100%, 95% to 98%, 95% to 99%, 95% to 100%, 98% to 99%, or 98% to 100%) of a surface portion of the battery. In yet other embodiments, the microdeposited formulation can cover at least about 10% (e.g., least about 20%, 30%, 40%, 50%, 60%, 70%, 80%, 90%, or 100%) or from about 10% to about 100% (e.g., from about 10% to 25%, 10% to 50%, 10% to 75%, 10% to 90%, 10% to 95%, 10% to 98%, 10% to 99%, 20% to 25%, 20% to 50%, 20% to 75%, 20% to 90%, 20% to 95%, 20% to 98%, 20% to 99%, 20% to 100%, 30% to 50%, 30% to 75%, 30% to 90%, 30% to 95%, 30% to 98%, 30% to 99%, 30% to 100%, 40% to 50%, 40% to 75%, 40% to 90%, 40% to 95%, 40% to 98%, 40% to 99%, 40% to 100%, 50% to 75%, 50% to 90%, 50% to 95%, 50% to 98%, 50% to 99%, 50% to 100%, 60% to 75%, 60% to 90%, 60% to 95%, 60% to 98%, 60% to 99%, 60% to 100%, 70% to 75%, 70% to 90%, 70% to 95%, 70% to 98%, 70% to 99%, 70% to 100%, 80% to 90%, 80% to 95%, 80% to 98%, 80% to 99%, 80% to 100%, 90% to 95%, 90% to 98%, 90% to 99%, 90% to 100%, 95% to 98%, 95% to 99%, 95% to 100%, 98% to 99%, or 98% to 100%)

of a periphery of the battery (e.g., a circumference defined between an anode cap and an cathode can of a coil cell).

Different components of the formulation can be selected to provide a desired characteristic. In one non-limiting embodiment, the components of the formulation provide a relatively non-conductive composite prior to exposure to moisture or an aqueous environment, as well as a relatively conductive composite after exposure. In another non-limiting embodiment, the polymer(s) provides a sufficiently water absorptive matrix, in which water is readily absorbed, transmitted, or diffused through the matrix in order to access the dispersed agents.

Non-conductivity can be determined in any useful manner, e.g., such as by measuring the potential (voltage) of the battery before and after deposition of the formulation and determining that the average potential (voltage) or capacity remains relatively constant (e.g., a difference of from about ±0.6V, ±0.5V, ±0.4V, ±0.2V, ±0.1V, or ±0.05V over a measured time period of from about 10 seconds to about 100 hours; or a difference in open circuit voltage of from about 0.1V to about 0.5V measured at room temperature (e.g., about 20° C. to 25° C.)) or within quality specification standards.

Conductivity can be measured in any useful manner, such as by determining the presence of a short circuit or by measuring the dissipating potential of the safety battery. In one instance, a short circuit is determined by measuring the potential (voltage) of the safety battery having the safety ink before and after exposure to an aqueous environment, thereby determining that the average potential (voltage) is less than a desired threshold level or between a desired potential range. In one instance, the desired threshold level is determined within a measured time period of from about 100 seconds to about 7200 seconds. In another instance, the desired threshold level is sufficient to reduce and/or prevent the electrolysis of water and the accompanying formation of harmful electrochemically-generated ions (e.g., hydroxide ions). Exemplary desired threshold levels include an average potential below 1.5V (e.g., below about 1.4V, 1.3V, 1.2V, 1.1V, 1.0V, 0.9V, 0.8V, 0.7V, 0.6V, 0.5V, 0.4V, 0.3V, 0.2V, 0.1V, and even to about 0V); and an exemplary potential range can be of from about 0V to about 1.5V (e.g., from about 0V to 0.1V, 0V to 0.2V, 0V to 0.3V, 0V to 0.4V, 0V to 0.5V, 0V to 0.6V, 0V to 0.7V, 0V to 0.8V, 0V to 0.9V, 0V to 1.0V, 0V to 1.1V, 0V to 1.2V, 0V to 1.3V, 0V to 1.4V, 0.1V to 0.2V, 0.1V to 0.3V, 0.1V to 0.4V, 0.1V to 0.5V, 0.1V to 0.6V, 0.1V to 0.7V, 0.1V to 0.8V, 0.1V to 0.9V, 0.1V to 1.0V, 0.1V to 1.1V, 0.1V to 1.2V, 0.1V to 1.3V, 0.1V to 1.4V, 0.1V to 1.5V, 0.2V to 0.3V, 0.2V to 0.4V, 0.2V to 0.5V, 0.2V to 0.6V, 0.2V to 0.7V, 0.2V to 0.8V, 0.2V to 0.9V, 0.2V to 1.0V, 0.2V to 1.1V, 0.2V to 1.2V, 0.2V to 1.3V, 0.2V to 1.4V, 0.2V to 1.5V, 0.3V to 0.4V, 0.3V to 0.5V, 0.3V to 0.6V, 0.3V to 0.7V, 0.3V to 0.8V, 0.3V to 0.9V, 0.3V to 1.0V, 0.3V to 1.1V, 0.3V to 1.2V, 0.3V to 1.3V, 0.3V to 1.4V, 0.3V to 1.5V, 0.4V to 0.5V, 0.4V to 0.6V, 0.4V to 0.7V, 0.4V to 0.8V, 0.4V to 0.9V, 0.4V to 1.0V, 0.4V to 1.1V, 0.4V to 1.2V, 0.4V to 1.3V, 0.4V to 1.4V, 0.4V to 1.5V, 0.5V to 0.6V, 0.5V to 0.7V, 0.5V to 0.8V, 0.5V to 0.9V, 0.5V to 1.0V, 0.5V to 1.1V, 0.5V to 1.2V, 0.5V to 1.3V, 0.5V to 1.4V, 0.5V to 1.5V, 0.6V to 0.7V, 0.6V to 0.8V, 0.6V to 0.9V, 0.6V to 1.0V, 0.6V to 1.1V, 0.6V to 1.2V, 0.6V to 1.3V, 0.6V to 1.4V, 0.6V to 1.5V, 0.7V to 0.8V, 0.7V to 0.9V, 0.7V to 1.0V, 0.7V to 1.1V, 0.7V to 1.2V, 0.7V to 1.3V, 0.7V to 1.4V, 0.7V to 1.5V, 0.8V to 0.9V, 0.8V to 1.0V, 0.8V to 1.1V, 0.8V to 1.2V, 0.8V to 1.3V, 0.8V to 1.4V, 0.8V to 1.5V, 0.9V to 1.0V, 0.9V to 1.1V, 0.9V to 1.2V, 0.9V to 1.3V, 0.9V to 1.4V, 0.9V to 1.5V, 1.0V to 1.1V, 1.0V to 1.2V, 1.0V to 1.3V, 1.0V to 1.4V, 1.0V to 1.5V, 1.1V to 1.2V, 1.1V to 1.3V, 1.1V to 1.4V, 1.1V to 1.5V, 1.2V to 1.3V, 1.2V to 1.4V, 1.2V to 1.5V, 1.3V to 1.4V, 1.3V to 1.5V, or 1.4V to 1.5V).

Generally, shorting the voltage of the battery cell below about 1.2V entirely prevents electrolysis of water, but reducing the voltage below 1.5V can help reduce the amount of electrolysis that would otherwise occur. Furthermore, the formulation can provide shorting within a particular time period, e.g., within two hours (or 7200 seconds) as significant burning of esophageal tissues is less likely to occur until after two hours.

In addition to being responsive to the presence of water, the formulation can be responsive to other stimuli, e.g., pH, heat, presence of a triggering agent (e.g., hydroxyl ions), etc. In one non-limiting embodiment, the deposited formulation does not necessarily transition from an electrically non-conducting state to an electrically conducting state when exposed to water alone. For instance, the deposited formulation may be water-responsive and pH-responsive, in which the composite remains in a non-conducting state when in contact with aqueous solutions having a first defined pH range and transitions to a conducting state in response to contact with an aqueous fluid having a second, different defined pH range (e.g., physiological pH, such as that of saliva, or a pH indicative of the presence of hydroxyl ions).

For instance, the first defined pH range can include an acidic pH to a neutral pH, and the second defined pH range can include a neutral pH to a basic pH. Exemplary first defined pH ranges include a range of from about 0 to about 5 (e.g., from about 0 to 4.5, 0 to 4, 0 to 3, 0 to 2, 0 to 1, 1 to 5, 1 to 4.5, 1 to 4, 1 to 3, 1 to 2, 1.5 to 5, 1.5 to 4.5, 1.5 to 4, 1.5 to 3, 1.5 to 2, 2 to 5, 2 to 4.5, 2 to 4, 2 to 3, 2.5 to 5, 2.5 to 4.5, 2.5 to 4, 2.5 to 3, 3 to 5, 3 to 4.5, 3 to 4, 3.5 to 5, 3.5 to 4.5, 3.5 to 4, 4 to 5, 4 to 4.5, or 4.5 to 5) or from about 0 to about 7 (e.g., from about 0 to 6.5, 0 to 6, 0 to 5.5, 0 to 5, 0 to 4.5, 0 to 4, 0 to 3, 0 to 2, 0 to 1, 1 to 7, 1 to 6.5, 1 to 6, 1 to 5.5, 1 to 5, 1 to 4.5, 1 to 4, 1 to 3, 1 to 2, 1.5 to 7, 1.5 to 6.5, 1.5 to 6, 1.5 to 5.5, 1.5 to 5, 1.5 to 4.5, 1.5 to 4, 1.5 to 3, 1.5 to 2, 2 to 7, 2 to 6.5, 2 to 6, 2 to 5.5, 2 to 5, 2 to 4.5, 2 to 4, 2 to 3, 2.5 to 7, 2.5 to 6.5, 2.5 to 6, 2.5 to 5.5, 2.5 to 5, 2.5 to 4.5, 2.5 to 4, 2.5 to 3, 3 to 7, 3 to 6.5, 3 to 6, 3 to 5.5, 3 to 5, 3 to 4.5, 3 to 4, 3.5 to 7, 3.5 to 6.5, 3.5 to 6, 3.5 to 5.5, 3.5 to 5, 3.5 to 4.5, 3.5 to 4, 4 to 7, 4 to 6.5, 4 to 6, 4 to 5.5, 4 to 5, 4 to 4.5, 4.5 to 7, 4.5 to 6.5, 4.5 to 6, 4.5 to 5.5, or 4.5 to 5); and exemplary second pH ranges include a range of from about 5 to 14 (e.g., from 5 to 13, 5 to 12, 5 to 11, 5 to 10, 5 to 9, 5 to 8, 5 to 7.8, 5 to 7.6, 5 to 7, 5 to 6, 5.5 to 14, 5.5 to 13, 5.5 to 12, 5.5 to 11, 5.5 to 10, 5.5 to 9, 5.5 to 8, 5.5 to 7.8, 5.5 to 7.6, 5.5 to 7, 5.5 to 6, 6 to 14, 6 to 13, 6 to 12, 6 to 11, 6 to 10, 6 to 9, 6 to 8, 6 to 7.8, 6 to 7.6, 6 to 7, 6.2 to 14, 6.2 to 13, 6.2 to 12, 6.2 to 11, 6.2 to 10, 6.2 to 9, 6.2 to 8, 6.2 to 7.8, 6.2 to 7.6, 6.2 to 7, 6.5 to 14, 6.5 to 13, 6.5 to 12, 6.5 to 11, 6.5 to 10, 6.5 to 9, 6.5 to 8, 6.5 to 7.8, 6.5 to 7.6, 6.5 to 7, 7 to 14, 7 to 13, 7 to 12, 7 to 11, 7 to 10, 7 to 9, 7 to 8, 7 to 7.8, 7 to 7.6, 7.5 to 14, 7.5 to 13, 7.5 to 12, 7.5 to 11, 7.5 to 10, 7.5 to 9, 7.5 to 8, 7.5 to 7.8, 8 to 14, 8 to 13, 8 to 12, 8 to 11, 8 to 10, 8 to 9, 8.5 to 14, 8.5 to 13, 8.5 to 12, 8.5 to 11, 8.5 to 10, 8.5 to 9, 9 to 14, 9 to 13, 9 to 12, 9 to 11, 9 to 10, 9.5 to 14, 9.5 to 13, 9.5 to 12, 9.5 to 11, 9.5 to 10, 10 to 14, 10 to 13, 10 to 12, 10 to 11, 10.5 to 13, 10.5 to 12, 10.5 to 11, 11 to 14, 11 to 13, 11 to 12, 11.5 to 14, 11.5 to 13, 11.5 to 12, 12 to 14, 12 to 13, 12.5 to 14, 12.5 to 13, 13 to 14, or 13.5 to 14) or from about 7 to about 14 (e.g., from about 7 to 13, 7 to 12, 7 to 11, 7 to 10, 7 to 9, 7 to 8, 7 to 7.8, 7 to 7.6, 7.5 to 14, 7.5 to 13, 7.5 to 12, 7.5 to 11, 7.5 to 10, 7.5 to 9, 7.5 to 8, 7.5 to 7.8, 8 to 14, 8 to 13, 8 to 12, 8 to 11, 8 to 10, 8 to 9, 8.5 to 14, 8.5 to 13, 8.5 to 12, 8.5 to 11, 8.5 to 10, 8.5 to 9, 9 to 14, 9 to 13, 9 to 12, 9 to 11, 9 to 10, 9.5 to 14, 9.5 to 13, 9.5 to 12, 9.5 to 11, 9.5 to 10, 10 to 14, 10 to 13, 10 to 12, 10 to 11, 10.5 to 13, 10.5 to 12, 10.5 to 11, 11 to 14, 11 to 13, 11 to 12, 11.5 to 14, 11.5 to 13, 11.5 to 12, 12 to 14, 12 to 13, 12.5 to 14, 12.5 to 13, 13 to 14, or 13.5 to 14).

In one non-limiting embodiment, the pH of a bodily fluid (e.g., saliva) modified as a result of the electrolysis of water can facilitate the formation of an electrical connection (e.g., by way of dendrite growth), which can lead to shorting of the cell. As a non-limiting example, the deposited formulation may include a polymer (e.g., PVAc or any polymer herein), a non-metal salt (e.g., ammonium carbonate), and a metal agent (e.g., a metal powder, such as copper powder or zinc powder). Contacting the deposited formulation with an alkaline medium (e.g., saliva) can cause the ammonium carbonate to form ammonia and carbonate anions. Furthermore, the metal powder can be oxidized to form metal cations capable of being reduced at the negative pole, such that dendritic metallic structures can grow to electrically connect the negative and positive poles (e.g., under a safety condition, for example, when a person (e.g., an infant) or animal swallows the battery cell).

In another embodiment, physiological pH (e.g., about 7.0) can facilitate the formation of an electrical connection (e.g., by way of dendrite growth), which can lead to shorting of the cell. Thus, the deposited formulation can remain in a non-conducting state in an aqueous fluid with neutral or acidic pH (e.g., below 7.0) and can change to a conducting state in response to exposure to an aqueous fluid having an alkaline pH (e.g., over 7.0). As a non-limiting example, the deposited formulation can include a polymer (e.g., PVAc), a non-metal salt (e.g., a water-soluble non-metal salt, such as ammonium chloride), and a metal salt (e.g., a water-insoluble copper metal salt, such as copper carbonate). In another non-limiting example, the deposited formulation can include a polymer (e.g., PVAc), a water-soluble salt (e.g., a water-soluble, non-metal salt or a water-soluble, non-transition metal salt), and a water-insoluble salt (e.g., a water-insoluble metal salt). Without wishing to be limited by mechanism, contacting the deposited formulation with an alkaline medium (e.g., saliva) can cause the ammonium chloride ($NH_4Cl$) to dissolve in the vicinity of and within the deposited formulation (e.g., the polymeric matrix of the composite). When hydroxide ions are produced at the negative pole due to water electrolysis, such hydroxide ions can deprotonate the ammonium ions to form aqueous ammonia ($NH_3$). Aqueous/soluble ammonia can react with the substantially insoluble metal salt copper carbonate to form a soluble complex ion $Cu(NH_3)_4^{2+}$, which is capable of being reduced at the negative pole to form a conductive agent, such as a dendritic metallic structure.

The deposited formulation can also be optimized to ensure that a sufficient amount of water is absorbed before transitioning to an electronically conducting state or before forming an electrical connection between the negative and positive poles. In this way, exposure to ambient air at low or average relative humidity does not result in a short circuit. In one non-limiting embodiment, the deposited formulation itself is hygroscopic. In another non-limiting embodiment, the formulation or the deposited formulation includes hygroscopic components and non-hygroscopic components. Upon exposure to high humidity environments for extended periods, the formulation or deposited formulation can provide an electrical connection between the poles. In one examples, the safety battery (e.g., any described herein) can be stored for at least two hours (e.g., at least 12 hours, 2 days, 10 days, 30 days, 60 days, or 90 days) in an environment having relative humidity values of up to 65% or higher (e.g., up to 90%).

Metal Agents, Including Metal Reactants, Metal Salts, Metal Reducing Agents, and Metal Powders The present invention relates, in part, to a safety formulation or a deposited formulation including a metal agent, which is any agent including one or more metal elements or atoms, including ionic forms thereof (e.g., cationic, anionic, or oxyanionic forms thereof), salts thereof, oxide forms thereof, hydroxides thereof, hydroxide salts thereof, hydroxide double salts thereof, solvates thereof, and hydrates thereof. Exemplary metal agents can include a metal reactant, a metal salt, a metal reducing agent, or a metal powder (e.g., any described herein). The metal agent can be provided in any form, such as in powder form, particle form, dust form, etc.

The metal reactant can be configured to form an electrical connection between the negative pole and the positive pole upon exposure to moisture. Exemplary metal reactants include hygroscopic metal agents, water-soluble metal agents, water-insoluble metal agents, metal powders (e.g., elemental metal powders), metal cations (e.g., transition metal cations), metal anions (e.g., transition metal anions), and/or metal salts (e.g., transition metal salts). Further exemplary metal reactants include copper agents, such as copper salts, copper sulfate (e.g., $CuSO_4$ or $CuSO_2$, including hydrates thereof, such as copper sulfate pentahydrate, hydroxides thereof, hydroxide salts thereof, and hydroxide double salts thereof), copper carbonate (e.g., $CuCO_3$ (neutral copper carbonate), $CuCO_3 \cdot Cu(OH)_2$ (basic copper carbonate), $CuCO_4$, $Cu_2CO_3$, or $Cu_2CO_4$), or copper nitrate (e.g., $Cu(NO_3)_2$); water-insoluble metals, e.g., copper carbonate (e.g., $CuCO_3$), copper metal ($Cu(0)$), copper oxide (e.g., $CuO$, $Cu_2O$, $Cu_2O_3$, or $CuO_2$), copper hydroxide (e.g., $CuOH$ or $Cu(OH)_2$), copper oxychloride, copper acetoarsenite, copper oxalate (e.g., $CuC_2O_4$ and hydrates thereof, such as $CuC_2O_4 \cdot 2H_2O$, hydroxides thereof, hydroxide salts thereof, and hydroxide double salts thereof), etc.; metal reducing agents, e.g., metallic elements, including $Zn(0)$, $Mg(0)$, $Fe(0)$, or $Cu(0)$, or any metal powder described herein; salts including one or more of bismuth (Bi, e.g., Bi(III) or $Bi^{3+}$), copper (Cu, e.g., Cu(II) or $Cu^{2+}$), iron (Fe, e.g., Fe(II) or $Fe^{2+}$), indium (In, e.g., In(III) or $In^{3+}$), lead (Pb, e.g., Pb(II) or $Pb^{2+}$), mercury (Hg, e.g., Hg(II) or $Hg^{2+}$), nickel (Ni, e.g., Ni(II) or $Ni^{2+}$), silver (Ag, e.g., Ag(I) or AO, tin (Sn, e.g., Sn(II) or $Sn^{2+}$), zinc (Zn, e.g., Zn(II) or $Zn^{2+}$), as well as combinations thereof, hydrates thereof, hydroxides thereof, hydroxide salts thereof, hydroxide double salts thereof, and dehydrates thereof. Specific metal salts include but are not limited to bismuth carbonate, bismuth chloride, bismuth hydroxide, bismuth nitrate, bismuth oxide, bismuth phosphate, bismuth subsalicylate, bismuth sulfate, copper carbonate, copper chloride, copper hydroxide, copper oxalate, copper pyrophosphate, copper sulfate, iron carbonate, iron chloride, iron hydroxide, iron oxalate, iron sulfate, indium carbonate, indium chloride, indium sulfate, lead carbonate, lead chloride, lead sulfate, mercury carbonate, mercury chloride, mercury sulfate, nickel carbonate, nickel chloride, nickel sulfate, silver carbonate, silver chloride, silver nitrate, silver sulfate, tin carbonate, tin chloride, tin sulfate, zinc acetate, zinc carbonate, zinc chloride, zinc gluconate, zinc sulfate, and combinations thereof.

Another exemplary metal agent includes a metal powder, which can be particles of a metallic element or a metal alloy in its fully reduced state. Such metal powders can be used as a reducing agent and/or in conjunction with one or more metal salts (e.g., any described herein). A metal powder can remain in its reduced form in the deposited formulation and may assist in dendrite growth and percolation throughout a polymeric matrix. Exemplary elemental metal powders including but not limited to Bi(0), Cu(0), Fe(0), In(0), Pb(0), Mg(0), Hg(0), Ni(0), Ag(0), Sn(0), Zn(0), as well as alloys and combinations thereof. Additionally, the metal powder can be oxidized by the positive pole, thereby providing a source of ions capable of serving as a sacrificial substance for dendrite growth. The metal powder can also serve as a bridge and as a sacrificial substance for dendrite growth simultaneously. Thus, in yet another embodiment, a formulation or a deposited formulation may include a polymer material as described above and a metal powder, with substantially no metal salt included therein.

Reducing Agents

A safety formulation or deposited formulation, as described herein, can include one or more reducing agents, which can include organic reducing agents, inorganic reducing agents, or particles of a metallic element or a metal alloy in its fully reduced state. Without wishing to be limited by mechanism, the reducing agent can be capable of reducing soluble metal ions (e.g., metal cations or metal salts) into conductive agents (e.g., elemental metal) without application of a cell potential even at locations far from the negative pole (that is, electro-less deposition of metal occurs). Electro-less deposition of metal can help create bridging dendrite sections as they grow in the formulation or deposited formulation, so as to establish an electronic connection between the battery poles and thereby facilitate shorting of the cell. Exemplary, non-limiting reducing agents include ascorbic acid or ascorbate salts, tocopherols, sodium borohydride, aluminum (Al, e.g. Al(0)), calcium (Ca, e.g., Ca(0)), iron (Fe, e.g., Fe(0)), magnesium (e.g., Mg(0)), nickel (e.g., Ni(0)), tin (e.g., Sn(0)), titanium (e.g., Ti(0)), zinc (e.g., Zn(0)), as well as alloys and combinations thereof. The reducing agent can be provided in any useful form (e.g., particles, powders, rods, etc.).

Polymers

The safety ink formulation or deposited formulation generally includes one or more polymers, which provide a matrix in which to provide one or more metal agent (e.g., a metal reactant, or a combination of a metal reactant with a reducing agent). In general, the polymer is sufficiently electrically insulating, thereby ensuring that the polymer itself does not provide non-specific shorting when deposited on a battery. In non-limiting embodiments, the polymer (alone or in combination as in a formulation) is water permeable or hygroscopic, thereby transmitting, diffusing, or absorbing sufficient moisture (e.g., liquid water or water vapor) to react with one or more metal agents (e.g., react with a metal reactant).

Exemplary polymers include, e.g., poly(ethylene glycol) (PEG) (e.g., 4K (such as one having a molecular weight Mw or an average Mw of from about 3600 to 4400), 6K (such as one having a Mw or an average Mw of from about 5400 to 6600), 8K (such as one having a Mw or an average Mw of from about 7000 to 9000), etc., including functional forms thereof, cross-linker forms thereof, and multi-arm forms thereof), poly(ethylene oxide) (PEO), poly(vinyl alcohol) (PVA) (e.g., 500 k (such as one having a Mw or an average Mw of about 500,000), 130 k (such as one having an average Mw of about 130,000), including modified PVA and hydrolyzed forms thereof), poly(vinyl acetate) (PVAc) (e.g., 100 k (such as one having an average Mw of about 100,000), 140 k (such as one having an average Mw of about 140,000), 500 k (such as one having an average Mw of about 500,000), including modified PVAc), poly(methyl methacrylate) (PMMA) (e.g., 75 k), poly(ethyl methacrylate) (PEMA), poly(dimethyl siloxane) (PDMS), cellulose (e.g., ethyl cellulose (EC), cellulose acetate, or nanofibrillated cellulose), polystyrene (PS), poly(vinyl chloride) (PVC), polyacrylic acid (PAA), polyacrylamide (PAAM), poly(N-isopropylacrylamide) (NIPAM), polyacrylate (including, e.g., water-soluble acrylate copolymers), poly(propylene maleate), poly(propylene fumarate), hyaluronic acid (HA), alginate, agarose, chitin, chitosan, fibrin, albumin (e.g., cross-linked forms thereof), poly(caprolactone) (PCL), poly(lactic acid) (PLA, e.g., poly(L-lactic acid) (PLLA) or poly(D-lactic acid) (PDLA) or poly(DL-lactic acid) (PDLLA)), poly(glycolic acid) (PGA), polyamide (PA), poly(lysine) (e.g., poly(L-lysine), PLL), polyvinylester, polyvinyl pyrrolidone (PVP), pullulan, gelatin, hydroxylpropylmethyl cellulose (HPMC), low viscosity grade hydroxypropylcellulose, polysaccharide, and combinations or co-polymers thereof (e.g., PEG-PVA, PLGA (poly(lactic-co-glycolic acid), PEG-PLGA, PEG-PCL, PEG-PEI, PEG-PLA, PEG-PLL, PVA-MA (poly(vinyl alcohol)-methacrylate), poly(ethylene glycol)diacrylate (PEGDA), acrylamide-PEGDA (AP), gelatin methacrylate (GelMA), thermoplastic polyurethane/poly(lactic acid) (TPU/PLA), etc.) or graft forms thereof or linker forms thereof (e.g., acrylate, amide, diols, etc.) or cross-linked forms thereof. Further exemplary polymers include polymethacrylates (e.g., polymethylmethacrylate), polyvinyl alcohols including modified polyvinyl alcohols, acrylate copolymers, polyvinyl esters (e.g., poly(vinyl acetate), poly(vinyl butyrate), poly(vinyl propionate), and poly(vinyl formate)), water-soluble natural polymers (e.g., guar gum, xanthan gum, locust bean gum, carrageenan, starch, and modified starches including, but not limited to, ethoxylated starch and hydroxypropylated starch), as well as copolymers thereof (e.g., polyvinyl ester copolymers such as poly(ethylene-vinyl acetate)) or combinations or cross-linked forms thereof.

Polymers can have any useful composition, such as a molecular weight of at least 1 kD (kilodalton) or between about 1 kD and about 1000 kD (e.g., of from about 1 kD to 25 kD, 1 kD to 50 kD, 1 kD to 100 kD, 1 kD to 200 kD, 1 kD to 250 kD, 1 kD to 300 kD, 1 kD to 400 kD, 1 kD to 500 kD, 1 kD to 600 kD, 1 kD to 700 kD, 1 kD to 750 kD, 1 kD to 800 kD, 1 kD to 900 kD, 5 kD to 25 kD, 5 kD to 50 kD, 5 kD to 100 kD, 5 kD to 200 kD, 5 kD to 250 kD, 5 kD to 300 kD, 5 kD to 400 kD, 5 kD to 500 kD, 5 kD to 600 kD, 5 kD to 700 kD, 5 kD to 750 kD, 5 kD to 800 kD, 5 kD to 900 kD, 5 to 1000 kD, 10 kD to 25 kD, 10 kD to 50 kD, 10 kD to 100 kD, 10 kD to 200 kD, 10 kD to 250 kD, 10 kD to 300 kD, 10 kD to 400 kD, 10 kD to 500 kD, 10 kD to 600 kD, 10 kD to 700 kD, 10 kD to 750 kD, 10 kD to 800 kD, 10 kD to 900 kD, 10 to 1000 kD, 25 kD to 50 kD, 25 kD to 100 kD, 25 kD to 200 kD, 25 kD to 250 kD, 25 kD to 300 kD, 25 kD to 400 kD, 25 kD to 500 kD, 25 kD to 600 kD, 25 kD to 700 kD, 25 kD to 750 kD, 25 kD to 800 kD, 25 kD to 900 kD, 25 to 1000 kD, 50 kD to 100 kD, 50 kD to 200 kD, 50 kD to 250 kD, 50 kD to 300 kD, 50 kD to 400 kD, 50 kD to 500 kD, 50 kD to 600 kD, 50 kD to 700 kD, 50 kD to 750 kD, 50 kD to 800 kD, 50 kD to 900 kD, 50 to 1000 kD, 75 kD to 100 kD, 75 kD to 200 kD, 75 kD to 250 kD, 75 kD to 300 kD, 75 kD to 400 kD, 75 kD to 500 kD, 75 kD to 600 kD, 75 kD to 700 kD, 75 kD to 750 kD, 75 kD to 800 kD, 75 kD to 900 kD, 75 to 1000 kD, 100 kD to 200 kD, 100 kD to 250 kD, 100 kD to 300 kD, 100 kD to 400 kD, 100 kD to 500 kD, 100 kD to 600 kD, 100 kD to 700 kD, 100 kD to 750 kD, 100 kD to 800 kD, 100 kD to 900 kD, 100 to 1000 kD, 250 kD to 300 kD, 250 kD to 400 kD, 250 kD to 500 kD, 250 kD to 600 kD, 250 kD to 700 kD, 250 kD to 750 kD, 250 kD to 800 kD, 250 kD to 900 kD, 250 to 1000 kD, 500 kD to 600 kD, 500 kD to 700 kD, 500 kD to 750 kD, 500 kD to 800 kD, 500 kD to 900 kD, 500 to 1000 kD, 750 kD to 800 kD, 750 kD to 900 kD, or 750 to 1000 kD). The polymer can be provided in any useful form, such as a matrix (e.g., in which the polymer forms the bulk matrix in which other components can be dispersed) or a composite (e.g., in which the composite includes multiple components and multiple, different phase domains, and the polymer is one of the components, e.g., in which the polymer is a component of the continuous phase) or a multilayered form (e.g., multilamellar form).

The polymer can be a combination of any polymers described herein, in which, e.g., a monomer of a first polymer is combined or co-polymerized with a monomer of a second polymer; or a first polymer is copolymerized in the presence of a monomer of a second polymer; or a first polymer is grafted with a second polymer or a second monomer. Monomers can include functional forms thereof, such as functionalized forms (e.g., ethoxylated, pegylated, carboxylated, etc.) or linker forms (e.g., acrylates, amides, diols, carboxyls, etc. of a monomer).

The polymer, as well as the resulting formulation, can be characterized by any useful property. In one non-limiting instance, the polymer (and/or the formulation) is water-permeable, thereby allowing for sufficient water (e.g., moisture) to be absorbed or transmitted through the polymeric composite and in proximity to one or more metal reactants (e.g., any herein). In another non-limiting instance, the polymer is electrically insulating in the absence of water. In yet another non-limiting instance, the polymer is non-biodegradable. In another non-limiting instance, the polymer is non-toxic or biologically inert, in which minimal toxicity is observed within a period of time when tested in vitro (e.g., in cellular assays) or in vivo (e.g., in animal studies) in any useful standard (e.g., pharmacokinetic/pharmacodynamic studies that assess toxicity, such as genotoxicity, carcinogenicity, acute toxicity, chronic toxicity, etc.).

In one non-limiting embodiment, the formulation or deposited formulation includes a polymer but is substantially free of (added) metal salt. In this regard, the metal materials of the negative pole may be oxidized, thereby providing a source of ions capable of serving as a sacrificial substance for dendrite growth. Accordingly, one embodiment of a safety battery can include a housing including first and second poles; and a deposited formulation including a polymer material that is positioned adjacent to at least one of the first and second poles, the deposited formulation (or composite) being adapted to change from a non-electrically conducting state to an electrically conducting state when contacted with water (e.g., an aqueous solution).

Water-Soluble Salts and Non-Metal Salts

The formulation can also include one or more water-soluble salts. Without wishing to be limited by mechanism, the presence of such water-soluble salt(s) can provide ligands or electrons that facilitate the redox reaction occurring within the deposited composite. In addition, such water-soluble salts can provide other beneficial properties, such as by increasing local salt concentrations, which in turn can affect permeability, conductivity, nucleation (e.g., gas bubble nucleation or metal growth nucleation), metal deposition, and/or reactivity within the composite. Such water-soluble salts can include non-metal salts (e.g., non-transitional metal salts) or metal salts (e.g., alkali metal salts). Exemplary water-soluble salts include ammonium salts, such as ammonium carbonate (($NH_4)_2CO_3$) or ammonium chloride ($NH_4Cl$); an alkali salt, including sodium salts, such as sodium chloride (NaCl) or sodium sulfonate, or potassium salts, such as potassium chloride (KCl); an alkaline salt, including calcium salts, such as calcium sulfonate; halide salts, including chloride salts, etc.

Solubility in water can be determined in any useful manner. In one non-limiting instance, a water-soluble compound (e.g., a water-soluble salt) can refer to a solute that has a solubility in water (at about 25° C., about pH 7) of greater than about 100 mg/L (e.g., greater than about 150 mg/L, 200 mg/L, 500 mg/L, 1000 mg/L, 10 g/L, and/or 100 g/L) or from about 100 mg/L to about 500 g/L (e.g., from 100 mg/L to 150 mg/L, 100 mg/L to 200 mg/L, 100 mg/L to 500 mg/L, 100 mg/L to 1000 mg/L, 100 mg/L to 10 g/L, 100 mg/L to 50 g/L, 100 mg/L to 100 g/L, 100 mg/L to 200 g/L, 100 mg/L to 300 g/L, 100 mg/L to 400 g/L, 150 mg/L to 200 mg/L, 150 mg/L to 500 mg/L, 150 mg/L to 1000 mg/L, 150 mg/L to 10 g/L, 150 mg/L to 50 g/L, 150 mg/L to 100 g/L, 150 mg/L to 200 g/L, 150 mg/L to 300 g/L, 150 mg/L to 400 g/L, 150 mg/L to 500 g/L, 200 mg/L to 500 mg/L, 200 mg/L to 1000 mg/L, 200 mg/L to 10 g/L, 200 mg/L to 50 g/L, 200 mg/L to 100 g/L, 200 mg/L to 200 g/L, 200 mg/L to 300 g/L, 200 mg/L to 400 g/L, 200 mg/L to 500 g/L, 500 mg/L to 1000 mg/L, 500 mg/L to 10 g/L, 500 mg/L to 50 g/L, 500 mg/L to 100 g/L, 500 mg/L to 200 g/L, 500 mg/L to 300 g/L, 500 mg/L to 400 g/L, 500 mg/L to 500 g/L, 1 g/L to 10 g/L, 1 g/L to 50 g/L, 1 g/L to 100 g/L, 1 g/L to 200 g/L, 1 g/L to 300 g/L, 1 g/L to 400 g/L, 1 g/L to 500 g/L, 5 g/L to 10 g/L, 5 g/L to 50 g/L, 5 g/L to 100 g/L, 5 g/L to 200 g/L, 5 g/L to 300 g/L, 5 g/L to 400 g/L, 5 g/L to 500 g/L, 25 g/L to 50 g/L, 25 g/L to 100 g/L, 25 g/L to 200 g/L, 25 g/L to 300 g/L, 25 g/L to 400 g/L, 25 g/L to 500 g/L, 50 g/L to 100 g/L, 50 g/L to 200 g/L, 50 g/L to 300 g/L, 50 g/L to 400 g/L, 50 g/L to 500 g/L, 100 g/L to 200 g/L, 100 g/L to 300 g/L, 100 g/L to 400 g/L, 100 g/L to 500 g/L, 250 g/L to 300 g/L, 250 g/L to 400 g/L, or 250 g/L to 500 g/L) determined in any useful manner (e.g., any described herein).

As an example, copper sulfate has a water solubility (at about 25° C., about pH 7) of about 220 g/L. Similarly, insolubility can be determined in any useful manner. In one non-limiting instance, a water-insoluble compound (e.g., a water-insoluble salt) can refer to a solute that has a solubility in water (at about 25° C., about pH 7) of less than about 10 mg/L (e.g., less than about 7.5 mg/L, 5 mg/L, 2.5 mg/L, and/or 1 mg/L). As a non-limiting example, copper(II) carbonate has a water solubility (at about 25° C., about pH 7) of about 1.46 mg/L, and basic copper carbonate has a water solubility (at about 25° C., about pH 7) of about 4.68 mg/L. Exemplary, non-limiting solubility values for a water-insoluble compound include of from about 1 µg/L to about 100 mg/L (e.g., 1 µg/L to 0.1 mg/L, 1 µg/L to 0.5 mg/L, 1 µg/L to 1 mg/L, 1 µg/L to 5 mg/L, 1 µg/L to 10 mg/L, 1 µg/L to 20 mg/L, 1 µg/L to 30 mg/L, 1 µg/L to 40 mg/L, 1 µg/L to 50 mg/L, 1 µg/L to 60 mg/L, 1 µg/L to 70 mg/L, 1 µg/L to 80 mg/L, 1 µg/L to 90 mg/L, and 1 µg/L to 100 mg/L) determined in any useful manner (e.g., any described herein).

When a combination of water-insoluble and water-soluble salts is used, a difference in magnitude of water solubility between the water-insoluble salt and the water-soluble salt may be present, in which the difference can be of at least about 10 times (e.g., at least about 100 times, 1,000 times, and/or 10,000 times) may be present. For example, copper sulfate is greater than 10,000 times more soluble in water than basic copper carbonate. In another instance, the ratio of water solubility between the water-insoluble salt and the water-soluble salt can be at least about 1:10 (e.g., at least about 1:100, 1:1,000, 1:10,000, or greater) or from about 1:10 to about 1:10,000 (e.g., from 1:10 to 1:100, 1:10 to 1:1,000, 1:25 to 1:100, 1:25 to 1:1,000, 1:25 to 1:10,000, 1:50 to 1:100, 1:50 to 1:1,000, 1:50 to 1:10,000, 1:75 to 1:100, 1:75 to 1:1,000, 1:75 to 1:10,000, 1:100 to 1:1,000, 1:100 to 1:10,000, 1:250 to 1:1,000, 1:250 to 1:10,000, 1:500 to 1:1,000, 1:500 to 1:10,000, 1:750 to 1:1,000, 1:750 to 1:10,000, 1:1,000 to 1:10,000, 1:2,000 to 1:10,000, 1:3,000 to 1:10,000, 1:5,000 to 1:10,000, or 1:7,500 to 1:10,000).

Water solubility values for many salts can sometimes be found in the literature, but are determined herein using either the "flask method" or the "column elution method." As described in EPA OPPTS 830.7840 (Water Solubility), which is hereby incorporated herein by reference, the column elution is used for substances with low solubilities (solubility less than 10 mg/L) and the flask method is used for substances with higher solubilities (solubility greater than 10 mg/L).

In brief, water solubility is determined in water at a relevant pH (e.g., between about 5.5 and about 8.5, such as 7.0) and a relevant temperature (e.g., of from about 20° C. to 30° C., such as about 25° C.). In the flask method, the test substance is first pulverized by grinding and weighed into a vessel, such that approximately 5× the quantity determined by a preliminary test is weighed into a vessel and then the indicated amount of water is added to the vessel (e.g., 1 L). When saturation is achieved, the mixture is cooled to the test temperature and stirring is performed until equilibrium is reached. The mass concentration of the test substance dissolved in the aqueous solution (it must not contain undissolved particles) can be determined analytically by any useful methodology (e.g., gas or liquid chromatography, titration, photometry, and/or voltammetry). Gas chromatography is preferred.

In the column elution method, a microcolumn including an excess of the test substance with an inert carrier (e.g., beads, silica, sand, etc.), is eluted with water and the mass concentration of the substance in the eluate is determined when the concentration of the eluate is constant. This method is based on the elution of the test substance with water at constant temperature from a column charged with the substance which is finely distributed on an inert support material. The flow rate of the water should be adjusted so that a saturated solution leaves the column. Saturation is achieved when, in consecutive fractions of the eluate at different flow rates, the mass concentration—determined by a suitable method—is constant. This is shown by a plateau when the concentration is plotted against time or eluted volume. As noted above, the mass concentration of the test substance dissolved in the aqueous solution can be determined analytically by any useful methodology (e.g., gas or liquid chromatography, titration, photometry, and/or voltammetry). Gas chromatography is preferred.

Further details for determining solubility include those in, e.g., Organisation for Economic Cooperation and Development (OECD), "Test No. 105: Water solubility," *OECD Guideline for the Testing of Chemicals*, adopted Jul. 27, 1995 (7 pp.); OECD—Environment Directorate: Joint Meeting of the Chemicals Committee and the Working Party on Chemicals, Pesticides and Biotechnology, "Guidance document on transformation/dissolution of metals and metal compounds in aqueous media," *OECD Series on Testing and Assessment*, Number 29, Jul. 23, 2001 (19 pp.); "Council Regulation (EC) No. 440/2008 of 30 May 2008 laying down test methods pursuant to Regulation (EC) No 1907/2006 of the European Parliament and of the Council on the Registration, Evaluation, Authorisation and Restriction of Chemicals (REACH)," Official J. European Union L142, Part. A.6 (p. 57-66), May 31, 2008, (739 pp.); U.S. Environmental Protection Agency, "Product Properties Test Guidelines—OPPTS 830.7860 Water Solubility (Generator Column Method)," EPA 712C-96-042, August 1996 (19 pp.); and U.S. Environmental Protection Agency, "Product Properties Test Guidelines—OPPTS 830.7840, Water Solubility: Column Elution Method; Shake Flask Method," EPA 712C-98-041, March 1998 (14 pp.), each of which is incorporated herein by reference in its entirety.

Additives

The formulation can include one or more additives, e.g., a thixotropic agent (or a thickening agent, such as a gelling agent), an anti-settling agent, a stabilizer (e.g., a rheology stabilizing agent), a humectant, a porogen, a photoinitiator (e.g., benzophenone, a xanthene dye, etc.), a surfactant (e.g., a nonionic surfactant), a flowability agent, a rheology modifier, a binder, an antistatic agent, a monomer, an inhibitor, an absorber, a diluent, a filler, a pigment (e.g., a dye or a colorant, such as any described herein), an adhesion promoter (e.g., any described herein), a pharmaceutically acceptable excipient, etc., as well as combinations thereof.

A stabilizer may be used to maintain the rheology of the composition by reducing settling. Exemplary stabilizers include dispersants, such as polyurethane- and polyacrylic-based dispersants available under the Efka® PU and Efka® PA trade names, respectively (BASF SE, Ludwigshafen, Germany); fumed silica rheology additives, including but not limited to those available under the Aerosil® trade name (Evonik Industries AG, Essen, Germany); fumed metal oxide, including but not limited to those available under the CAB-O-SIL® trade name (fumed silica, Cabot Corp., Boston, Mass.) and the SpectrAl® trade name (fumed alumina, Cabot Corp., Boston, Mass.); and chelating agents, such as sodium ethylenediaminetetraacetic acid (EDTA).

A porogen may be used to facilitate wetting and promote adhesion. Exemplary porogens include but are not limited to ammonium chloride, ammonium carbonate, citric acid, water-soluble saccharides (e.g., glucose, sucrose, fructose, etc.), polyethylene glycol, sodium chloride, sodium sulfonate, calcium sulfonate, and sodium acetate.

Flowability agents may be used to alter the rheology of the formulation, by either increasing or decreasing viscosity. Exemplary flowability agents include silica (e.g., fumed silica, a glassy silica, or hydrated silica), alumina (e.g., amorphous alumina or glassy alumina), silica oxide, alumina oxide, a glassy phosphate (e.g., vitreous phosphate), a glassy borate (e.g., vitreous borate), an oxide (e.g., a glassy oxide or vitreous oxide), titania (titanium dioxide), talc, mica, kaolin, attapulgite, a silicate (e.g., calcium silicate or magnesium silicate), or any combination thereof (e.g., silica with alumina; or alumina with titania), as well as treated forms thereof (e.g., surface-treated silica, such as a decyl trimethoxysilane (DTMS) surface-treated silica or a hexamethyldisilazane (HMDS) surface-treated silica).

Further exemplary flowability agents include CAB-O-SIL® M-5 (hydrophilic fumed silica, surface area about 200 $m^2/g$) including CAB-O-SIL® M-5F (food grade version of CAB-O-SIL® M-5) and CAB-O-SIL® M-5P (pharmaceutical grade version of CAB-O-SIL® M-5); CAB-O-SIL® EH (hydrophilic fumed silica, surface area about 380 $m^2/g$) including CAB-O-SIL® EH-5F (food grade version of CAB-O-SIL® EH); CAB-O-SIL® HS-5 (hydrophilic fumed silica, surface area about 320 $m^2/g$); CAB-O-SIL® H-5 (hydrophilic fumed silica, surface area about 300 $m^2/g$);

CAB-O-SIL® LM-150 (hydrophilic fumed silica, surface area about 160 m$^2$/g); VM-2270 (aerogel fine particles, silica silylate, Dow Corning Corp., Midland, Mich.); CAB-O-SIL® TS-710 (hydrophobic fumed silica, treated with poly (dimethylsiloxane) (PDMS), surface area about 100 m$^2$/g); CAB-O-SIL® TS-720 (hydrophobic fumed silica, treated with PDMS, surface area about 105 to 130 m$^2$/g or about 120 m$^2$/g); CAB-O-SIL® TS-610 (hydrophobic fumed silica, treated with dimethyldichlorosilane (DiMeDi), surface area about 105 to 145 m$^2$/g or about 125 m$^2$/g); CAB-O-SIL® TS-622 (silica dimethyl silylate, hydrophobic fumed silica treated with DiMeDi, surface area about 195 m$^2$/g); CAB-O-SIL® TS-530 (hydrophobic fumed silica, treated with hexamethyldisilazane (HMDS), surface area about 225 m$^2$/g); CAB-O-SIL® TS-5022 (hydrophobic fumed silica, treated with HMDS, surface area about 250 m$^2$/g); CAB-O-SIL® CLARUS™ 6560 (silica treated with HMDS); CAB-O-SIL® TS-382 (hydrophobic fumed silica, treated with octylsilane, surface area about 150 m$^2$/g); SpectrAl® 51 (fumed alumina, surface area about 55 m$^2$/g); SpectrAl® 81 (fumed alumina, surface area about 80 m$^2$/g); SpectrAl® 100 (fumed alumina, surface area about 95 m$^2$/g); Aerosil® 200 (hydrophilic fumed silica, surface area about 175 to 225 m$^2$/g) including Aerosil® 200 F (food grade version of Aerosil® 200) and Aerosil® 200 Pharma (pharmaceutical grade version of Aerosil® 200); Aerosil® 300 (hydrophilic fumed silica, surface area about 270 to 330 m$^2$/g) including Aerosil® 300 Pharma (pharmaceutical grade version of Aerosil® 300); Aerosil® 380 (hydrophilic fumed silica, surface area about 380 m$^2$/g) including Aerosil® 380 F (food grade version of Aerosil® 380); Aerosil® OX 50 (hydrophilic fumed silica with low thickening properties for high filler loading, surface area about 35 to 65 m$^2$/g); Aerosil® TT 600 (hydrophilic fumed silica with high degree of agglomeration, surface area about 150 to 250 m$^2$/g); Aerosil® RY 50 (hydrophobic fumed silica, treated with PDMS, surface area about 50 m$^2$/g); Aerosil® NY 50 (hydrophobic fumed silica, treated with PDMS, surface area about 50 m$^2$/g); Aerosil® NAX 50 (hydrophobic fumed silica, treated with HMDS, surface area about 30 to 50 m$^2$/g); Aerosil® RX 50 (hydrophobic fumed silica, treated with HMDS, surface area about 50 m$^2$/g); Aerosil® NA 50 H (hydrophobic fumed silica, treated with HMDS or PDMS and aminosilane, surface area about 50 m$^2$/g); Aerosil® NA 50 Y (hydrophobic fumed silica, treated with HMDS or PDMS and aminosilane, surface area about 50 m$^2$/g); Aerosil® R 974 (hydrophobic fumed silica, treated with dimethyldichlorosilane (DDS), surface area about 150 to 190 m$^2$/g or about 200 m$^2$/g); Aerosil® R 9200 (structure-modified, hydrophobic fumed silica, treated with DDS, surface area about 200 m$^2$/g); Aerosil® RY 200 (hydrophobic fumed silica, treated with PDMS, surface area about 200 m$^2$/g); Aerosil® RY 200 L (hydrophobic fumed silica, treated with PDMS, surface area about 200 m$^2$/g); Aerosil® RX 200 (hydrophobic fumed silica, treated with HMDS, surface area about 200 m$^2$/g); Aerosil® R 8200 (structure-modified, hydrophobic fumed silica, treated with HMDS, surface area about 200 m$^2$/g); Aerosil® R 504 (hydrophobic fumed silica, treated with HMDS or PDMS and aminosilane, surface area about 200 m$^2$/g); Aerosil® REA 200 (hydrophobic fumed silica, treated with HMDS or PDMS and aminosilane, surface area about 200 m$^2$/g); Aerosil® RA 200 HS (hydrophobic fumed silica, treated with HMDS or PDMS and aminosilane, surface area about 200 m$^2$/g); Aerosil® NA 200 Y (hydrophobic fumed silica, treated with HMDS or PDMS and aminosilane, surface area about 200 m$^2$/g); Aerosil® R 805 (hydrophobic fumed silica, treated with alkylsilane, surface area about 200 m$^2$/g); Aerosil® R 104 (hydrophobic fumed silica, treated with tetra (dimethylsiloxane), surface area about 200 m$^2$/g); Aerosil® R 976 (hydrophobic fumed silica, treated with DDS, surface area about 300 m$^2$/g); Aerosil® R 976 S (hydrophobic fumed silica, treated with DDS, surface area about 300 m$^2$/g); Aerosil® RY 300 (hydrophobic fumed silica, treated with PDMS, surface area about 300 m$^2$/g); Aerosil® R 812 (hydrophobic fumed silica, treated with HMDS, surface area about 300 m$^2$/g); Aerosil® R 812 S (hydrophobic fumed silica, treated with HMDS, surface area about 300 m$^2$/g); Aerosil® RX 300 (hydrophobic fumed silica, treated with HMDS, surface area about 300 m$^2$/g); Aerosil® R 106 (hydrophobic fumed silica, treated with tetra(dimethylsiloxane), surface area about 300 m$^2$/g); Aeroperl® 300/30 (granulated fumed silica, mean particle size of 30 μm), including Aeroperl® 300 Pharma (pharmaceutical grade version of Aeroperl® 300/30); Aeroxide® STX 501 (silica and titania, treated with HMDS, surface area about 45 m$^2$/g); Aeroxide® STX 801 (silica and titania, treated with HMDS, surface area about 80 m$^2$/g); Aeroxide® T 805 (titania, treated with alkylsilane, surface area about 50 m$^2$/g); Aeroxide® NKT 90 (titania, treated with alkylsilane, surface area about 90 m$^2$/g); Aeroxide® Alu C 805 (alumina, treated with alkylsilane, surface area about 100 m$^2$/g); Aeroxide® Alu C (fumed alumina, surface area about 100 m$^2$/g); Aeroxide® Alu 130 (fumed alumina, surface area about 130 m$^2$/g); and Aeroxide® TiO$_2$ P 90 (dispersed titania, surface area about 130 m$^2$/g or from about 70 to 110 m$^2$/g), as well as combinations thereof.

Additional flowability agents (or rheology modifiers) include cellulose, cellulose derivatives (e.g., hydroxyethyl cellulose or cellulose acetate butyrate), alginates, stearic acids, poly(ethylene glycol), poly(ethylene oxide), castor oil, polysaccharides (e.g., or their derivatives, such as xanthan), synthetic polymeric materials (e.g., polyacrylates, polyurethanes or polyamides), clays (e.g., bentonite clays, attapulgite clays, organoclays, kaolin), silicates (e.g., wollastonite, montmorillonite, or derivates thereof, such as alkylammonium montmorillonite), inorganic oxides (e.g., magnesium oxide), carbonates (e.g., calcium carbonate), and silica (e.g., any described herein), as well as combinations thereof, derivatives thereof, and emulsions thereof.

Other exemplary additives include binders, e.g., silica sand, stainless steel, ceramic beads, chromite, zircon, soda lime glass, bonded tungsten, tungsten carbide, polyesters, etc.; antistatic agents, e.g., compounds including sulfonic acid groups or alkylsulfonic metal salts; monomers, e.g., a monomeric form of any polymer described herein; inhibitors, e.g., radical inhibitors, such as butylated hydroxy toluene (BHT), methoxy hydroquinone (MEHQ), benzyl N,N' dimethyl amine (BDMA), and 9-anthranoic acid or esters thereof; absorbers, e.g., light absorbers, such as pyrenes, anthracenes, graphite powder, carbon black, and naphthol-based dyes, including 2-ethyl-9,10-dimethoxy anthracene (EDMA) or 1,4-bis(2-dimethylstyryl)benzene (BMSB)); a diluent (e.g., a solvent, such as any described herein, including a ketone, an alcohol, an acetate; or a monomer, such as any described herein); and a filler, e.g., particulate filler.

To facilitate adhesion of the formulation to a surface (e.g., an activated surface of a battery), the formulation can further include one or more adhesion promoters. In one non-limiting instance, silane adhesions promoters have been found to enhance adhesion of the safety formulation to the battery surface, especially after the surfaces have been activated using a UV/ozone treatment. Representative adhesion promoters include but are not limited to alkoxysilanes, halosilanes, branched silanes, dipodal silanes, aminosilanes, and cyclic silanes, such as dialkoxysilanes (e.g., diethoxydimethylsilane; diethoxy(methyl)vinylsilane; 1,3-diethoxy-1,1,3,3-tetramethyldisiloxane; dimethoxydimethylsilane; dimethoxydimethylsilane; dimethoxymethylvinylsilane; and methyldiethoxysilane), monoalkoxysilanes (e.g., ethoxytrimethylsilane and methoxytrimethylsilane); trialkoxysilanes (e.g., 3-aminopropyl)triethoxysilane (APTES); (chloromethyl)triethoxysilane; triethoxy(ethyl)silane; triethoxymethylsilane; triethoxyvinylsilane; trimethoxymethylsilane; and vinyltrimethoxysilane), trihalosilanes (e.g., tert-butyltrichlorosilane; di-n-octyldichlorosilane; hexachlorodisilane; methyltrichlorosilane; trichloro(dichloromethyl)silane; and trichlorovinylsilane); bissilanes (e.g., such as 1,2-bis(triethoxysilyl)ethane; 1,2-bis(trimethoxysilyl)ethane; 1,2-bis(trichlorosilyl)ethane; and bis(trichlorosilyl)methane); aminosilanes (e.g., N-(2-aminoethyl)-3-aminopropyl silanetriol, 3-aminopropylsilanetriol, 4-aminobutyltriethoxysilane, 4-amino-3,3-dimethylbutyltrimethoxysilane, 3-aminopropyltriethoxysilane, 3-aminopropyltrimethoxysilane, 3-aminopropylmethyldiethoxysilane, N-(2-aminoethyl)-3-aminopropyltrimethoxysilane, N-(2-aminoethyl)-3-aminopropylmethyldimethoxysilane, N-(2-aminoethyl)-3-aminopropylmethyldiethoxysilane, n-butylaminopropyltrimethoxysilane, (3-trimethoxysilylpropyl)diethylenetriamine, (N,N-diethylaminomethyl)triethoxysilane, (N,N-di ethyl-3-aminopropyl)trimethoxy silane, N,N'-bis[(3-trimethoxy silyl)propyl]ethylenediamine, [3-(1-piperazinyl)propyl]methyldimethoxysilane, and tris(triethoxysilylpropyl)amine); and cyclic azasilanes (e.g., N-n-butyl-aza-2,2-dimethoxysilacyclopentane, (N,N-dimethylaminopropyl)-aza-2-methyl-2-methoxysilacyclopentane, 1-ethyl-2,2-dimethoxy-4-methyl-1-aza-2-silacyclopentane, and (1-(3-triethoxysilyl)propyl)-2,2-diethoxy-1-aza-2-silacyclopentane), as well as combinations thereof and branched forms thereof.

Pigments

The formulation can include any useful pigment, such as phthalocyanine dyes (e.g., copper phthalocyanine, phthalo blue, phthalocyanine blue BN, or phthalocyanine green), carbon black pigments (e.g., such as those available from Cabot Corp. under tradenames Monarch®, Emperor®, Mogul®, Regal®, and Vulcan®), and other color additives (e.g., reactive dyes that can be reacted in the presence of a polymer such as cellulose, vinyl alcohol/methyl methacrylate copolymers, or poly(hydroxyethyl methacrylate), such as C.I. Reactive dyes, including C.I. Reactive Black 5, C.I. Reactive Blue 19, C.I. Reactive Blue 21, C.I. Reactive Orange 78, C.I. Reactive Red 180, or C.I. Reactive Yellow 15).

Solvents

The formulation may include a solvent to facilitate processing (e.g., printing or casting) and/or curing. Suitable solvents include but are not limited to aliphatic solvents, aromatic solvents, isoparaffin solvents, such as acetone, ethyl acetate, toluene, xylenes, terpinol, dimethylformamide (DMF), N-methylpyrrolidone (NMP), hexanes, pentanes, and diglyme. Use of solvent(s) can facilitate inkjet printing deposition, other spraying methods, spin casting, direct ink writing, and contact printing techniques such as flexographic printing, gravure printing, pad printing, and transfer printing.

Formulations

The present invention relates, in part, to safety ink formulations for providing a safety layer. In some non-limiting embodiments, the formulation is configured to provide a dispensable composition, e.g., by way of direct writing, printing, or spraying. In one example, the safety ink formulation or the deposited safety ink includes one or more metal reactants (e.g., a metal salt) and one or more polymers. Further exemplary ink formulations (including deposited inks) can include one or more reducing agents, additives, pigments, and/or solvents. Any characteristic described herein for the safety ink formulation can be used to describe a deposited safety ink. Any wt. % described herein can be based on the weight of the formulation or the weight of the deposited ink.

In one non-limiting embodiment, the ink formulation or deposited ink includes of from about 5 wt. % to about 95 wt. % of one or more metal reactants (e.g., one or more hygroscopic metal agents, water-soluble metal agents, water-insoluble metal agents, metal powders, metal salts, or combinations thereof) and about 5 wt. % to about 95 wt. % of one or more polymers (e.g., based on weight of the formulation or weight of the deposited ink). Exemplary amounts of metal reactant(s) and polymer(s) can include from about 5 wt. % to 95 wt. %, e.g., 5 wt. % to 10 wt. %, 5 wt. % to 20 wt. %, 5 wt. % to 25 wt. %, 5 wt. % to 30 wt. %, 5 wt. % to 40 wt. %, 5 wt. % to 50 wt. %, 5 wt. % to 60 wt. %, 5 wt. % to 70 wt. %, 5 wt. % to 75 wt. %, 5 wt. % to 80 wt. %, 5 wt. % to 90 wt. %, 10 wt. % to 20 wt. %, 10 wt. % to 25 wt. %, 10 wt. % to 30 wt. %, 10 wt. % to 40 wt. %, 10 wt. % to 50 wt. %, 10 wt. % to 60 wt. %, 10 wt. % to 70 wt. %, 10 wt. % to 75 wt. %, 10 wt. % to 80 wt. %, 10 wt. % to 85 wt. %, 10 wt. % to 90 wt. %, 10 wt. % to 95 wt. %, 25 wt. % to 30 wt. %, 25 wt. % to 40 wt. %, 25 wt. % to 50 wt. %, 25 wt. % to 60 wt. %, 25 wt. % to 70 wt. %, 25 wt. % to 75 wt. %, 25 wt. % to 80 wt. %, 25 wt. % to 90 wt. %, 25 wt. % to 95 wt. %, 30 wt. % to 40 wt. %, 30 wt. % to 50 wt. %, 30 wt. % to 60 wt. %, 30 wt. % to 70 wt. %, 30 wt. % to 75 wt. %, 30 wt. % to 80 wt. %, 30 wt. % to 90 wt. %, 30 wt. % to 95 wt. %, 40 wt. % to 50 wt. %, 40 wt. % to 60 wt. %, 40 wt. % to 70 wt. %, 40 wt. % to 75 wt. %, 40 wt. % to 80 wt. %, 40 wt. % to 90 wt. %, 40 wt. % to 95 wt. %, 50 wt. % to 60 wt. %, 50 wt. % to 70 wt. %, 50 wt. % to 75 wt. %, 50 wt. % to 80 wt. %, 50 wt. % to 90 wt. %, 50 wt. % to 95 wt. %, 60 wt. % to 70 wt. %, 60 wt. % to 75 wt. %, 60 wt. % to 80 wt. %, 60 wt. % to 90 wt. %, 60 wt. % to 95 wt. %, 70 wt. % to 75 wt. %, 70 wt. % to 80 wt. %, 70 wt. % to 90 wt. %, 70 wt. % to 95 wt. %, 75 wt. % to 80 wt. %, 75 wt. % to 90 wt. %, 75 wt. % to 95 wt. %, 80 wt. % to 90 wt. %, 80 wt. % to 95 wt. %, or 90 wt. % to 95 wt. % (e.g., based on weight of the formulation or weight of the deposited ink).

In another non-limiting embodiment, the ink formulation or deposited ink includes of from about 5 wt. % to about 95 wt. % of one or more metal salts (e.g., copper salts or any metal salts described herein), including from about, e.g., 5 wt. % to 10 wt. %, 5 wt. % to 20 wt. %, 5 wt. % to 25 wt. %, 5 wt. % to 30 wt. %, 5 wt. % to 40 wt. %, 5 wt. % to 50 wt. %, 5 wt. % to 60 wt. %, 5 wt. % to 70 wt. %, 5 wt. % to 75 wt. %, 5 wt. % to 80 wt. %, 5 wt. % to 90 wt. %, 10 wt. % to 20 wt. %, 10 wt. % to 25 wt. %, 10 wt. % to 30 wt. %, 10 wt. % to 40 wt. %, 10 wt. % to 50 wt. %, 10 wt. % to 60 wt. %, 10 wt. % to 70 wt. %, 10 wt. % to 75 wt. %, 10 wt. % to 80 wt. %, 10 wt. % to 85 wt. %, 10 wt. % to 90 wt. %, 10 wt. % to 95 wt. %, 25 wt. % to 30 wt. %, 25 wt. % to 40 wt. %, 25 wt. % to 50 wt. %, 25 wt. % to 60 wt. %, 25 wt. % to 70 wt. %, 25 wt. % to 75 wt. %, 25 wt. % to 80 wt. %, 25 wt. % to 90 wt. %, 25 wt. % to 95 wt. %, 30 wt. % to 40 wt. %, 30 wt. % to 50 wt. %, 30 wt. % to 60 wt. %, 30 wt. % to 70 wt. %, 30 wt. % to 75 wt. %, 30 wt. % to 80 wt. %, 30 wt. % to 90 wt. %, 30 wt. % to 95 wt. %, 40 wt. % to 50 wt. %, 40 wt. % to 60 wt. %, 40 wt. % to 70 wt. %, 40 wt. % to 75 wt. %, 40 wt. % to 80 wt. %, 40 wt. % to 90 wt. %, 40 wt. % to 95 wt. %, 50 wt. % to 60 wt. %, 50 wt. % to 70 wt. %, 50 wt. % to 75 wt. %, 50 wt. % to 80 wt. %, 50 wt. % to 90 wt. %, 50 wt. % to 95 wt. %, 60 wt. % to 70 wt. %, 60 wt. % to 75 wt. %, 60 wt. % to 80 wt. %, 60 wt. % to 90 wt. %, 60 wt. % to 95 wt. %, 70 wt. % to 75 wt. %, 70 wt. % to 80 wt. %, 70 wt. % to 90 wt. %, 70 wt. % to 95 wt. %, 75 wt. % to 80 wt. %, 75 wt. % to 90 wt. %, 75 wt. % to 95 wt. %, 80 wt. % to 90 wt. %, 80 wt. % to 95 wt. %, or 90 wt. % to 95 wt. % (e.g., based on weight of the formulation or weight of the deposited ink).

In yet another non-limiting embodiment, the ink formulation or deposited ink includes of from about 5 wt. % to about 95 wt. % of one or more water-soluble salts (e.g., a non-metal salt, a non-transition metal salt, an ammonium salt, an alkali salt, and/or a halide salt, such as any described herein), including from about, e.g., 5 wt. % to 10 wt. %, 5 wt. % to 20 wt. %, 5 wt. % to 25 wt. %, 5 wt. % to 30 wt. %, 5 wt. % to 40 wt. %, 5 wt. % to 50 wt. %, 5 wt. % to 60 wt. %, 5 wt. % to 70 wt. %, 5 wt. % to 75 wt. %, 5 wt. % to 80 wt. %, 5 wt. % to 90 wt. %, 10 wt. % to 20 wt. %, 10 wt. % to 25 wt. %, 10 wt. % to 30 wt. %, 10 wt. % to 40 wt. %, 10 wt. % to 50 wt. %, 10 wt. % to 60 wt. %, 10 wt. % to 70 wt. %, 10 wt. % to 75 wt. %, 10 wt. % to 80 wt. %, 10 wt. % to 85 wt. %, 10 wt. % to 90 wt. %, 10 wt. % to 95 wt. %, 25 wt. % to 30 wt. %, 25 wt. % to 40 wt. %, 25 wt. % to 50 wt. %, 25 wt. % to 60 wt. %, 25 wt. % to 70 wt. %, 25 wt. % to 75 wt. %, 25 wt. % to 80 wt. %, 25 wt. % to 90 wt. %, 25 wt. % to 95 wt. %, 30 wt. % to 40 wt. %, 30 wt. % to 50 wt. %, 30 wt. % to 60 wt. %, 30 wt. % to 70 wt. %, 30 wt. % to 75 wt. %, 30 wt. % to 80 wt. %, 30 wt. % to 90 wt. %, 30 wt. % to 95 wt. %, 40 wt. % to 50 wt. %, 40 wt. % to 60 wt. %, 40 wt. % to 70 wt. %, 40 wt. % to 75 wt. %, 40 wt. % to 80 wt. %, 40 wt. % to 90 wt. %, 40 wt. % to 95 wt. %, 50 wt. % to 60 wt. %, 50 wt. % to 70 wt. %, 50 wt. % to 75 wt. %, 50 wt. % to 80 wt. %, 50 wt. % to 90 wt. %, 50 wt. % to 95 wt. %, 60 wt. % to 70 wt. %, 60 wt. % to 75 wt. %, 60 wt. % to 80 wt. %, 60 wt. % to 90 wt. %, 60 wt. % to 95 wt. %, 70 wt. % to 75 wt. %, 70 wt. % to 80 wt. %, 70 wt. % to 90 wt. %, 70 wt. % to 95 wt. %, 75 wt. % to 80 wt. %, 75 wt. % to 90 wt. %, 75 wt. % to 95 wt. %, 80 wt. % to 90 wt. %, 80 wt. % to 95 wt. %, or 90 wt. % to 95 wt. % (e.g., based on weight of the formulation or weight of the deposited ink).

In another non-limiting embodiment, the ink formulation or deposited ink includes of from about 5 wt. % to about 95 wt. % of one or more metal powders (e.g., zinc powder or any metal powder described herein), including from about, e.g., 5 wt. % to 10 wt. %, 5 wt. % to 20 wt. %, 5 wt. % to 25 wt. %, 5 wt. % to 30 wt. %, 5 wt. % to 40 wt. %, 5 wt. % to 50 wt. %, 5 wt. % to 60 wt. %, 5 wt. % to 70 wt. %, 5 wt. % to 75 wt. %, 5 wt. % to 80 wt. %, 5 wt. % to 90 wt. %, 10 wt. % to 20 wt. %, 10 wt. % to 25 wt. %, 10 wt. % to 30 wt. %, 10 wt. % to 40 wt. %, 10 wt. % to 50 wt. %, 10 wt. % to 60 wt. %, 10 wt. % to 70 wt. %, 10 wt. % to 75 wt. %, 10 wt. % to 80 wt. %, 10 wt. % to 85 wt. %, 10 wt. % to 90 wt. %, 10 wt. % to 95 wt. %, 25 wt. % to 30 wt. %, 25 wt. % to 40 wt. %, 25 wt. % to 50 wt. %, 25 wt. % to 60 wt. %, 25 wt. % to 70 wt. %, 25 wt. % to 75 wt. %, 25 wt. % to 80 wt. %, 25 wt. % to 90 wt. %, 25 wt. % to 95 wt. %, 30 wt. % to 40 wt. %, 30 wt. % to 50 wt. %, 30 wt. % to 60 wt. %, 30 wt. % to 70 wt. %, 30 wt. % to 75 wt. %, 30 wt. % to 80 wt. %, 30 wt. % to 90 wt. %, 30 wt. % to 95 wt. %, 40 wt. % to 50 wt. %, 40 wt. % to 60 wt. %, 40 wt. % to 70 wt. %, 40 wt. % to 75 wt. %, 40 wt. % to 80 wt. %, 40 wt. % to 90 wt. %, 40 wt. % to 95 wt. %, 50 wt. % to 60 wt. %, 50 wt. % to 70 wt. %, 50 wt. % to 75 wt. %, 50 wt. % to 80 wt. %, 50 wt. % to 90 wt. %, 50 wt. % to 95 wt. %, 60 wt. % to 70 wt. %, 60 wt. % to 75 wt. %, 60 wt. % to 80 wt. %, 60 wt. % to 90 wt. %, 60 wt. % to 95 wt. %, 70 wt. % to 75 wt. %, 70 wt. % to 80 wt. %, 70 wt. % to 90 wt. %, 70 wt. % to 95 wt. %, 75 wt. % to 80 wt. %, 75 wt. % to 90 wt. %, 75 wt. % to 95 wt. %, 80 wt. % to 90 wt. %, 80 wt. % to 95 wt. %, or 90 wt. % to 95 wt. % (e.g., based on weight of the formulation or weight of the deposited ink).

In another non-limiting embodiment, the formulation includes of from about 10 wt. % to about 95 wt. % of one or more metal reactants (e.g., from about 10 wt. % to 25 wt. %, 10 wt. % to 50 wt. %, 10 wt. % to 75 wt. %, 20 wt. % to 50 wt. %, 20 wt. % to 75 wt. %, 20 wt. % to 95 wt. %, 25 wt. % to 50 wt. %, 25 wt. % to 75 wt. %, 25 wt. % to 95 wt. %, 50 wt. % to 75 wt. %, 50 wt. % to 95 wt. %, or 75 wt. % to 95 wt. %); about 5 wt. % to about 95 wt. % of one or more polymers (e.g., from about 5 wt % to 25 wt %, 5 wt % to 50 wt %, 5 wt % to 75 wt %, 10 wt. % to 25 wt. %, 10 wt. % to 50 wt. %, 10 wt. % to 75 wt. %, 10 wt. % to 95 wt. %, 20 wt. % to 50 wt. %, 20 wt. % to 75 wt. %, 20 wt. % to 95 wt. %, 25 wt. % to 50 wt. %, 25 wt. % to 75 wt. %, 25 wt. % to 95 wt. %, 50 wt. % to 75 wt. %, 50 wt. % to 95 wt. %, or 75 wt. % to 95 wt. %); 0 wt. % to about 95 wt. % of one or more reducing agents (e.g., from about 0 wt. % to 25 wt. %, 0 wt. % to 50 wt. %, 0 wt. % to 75 wt. %, 5 wt. % to 25 wt. %, 5 wt. % to 50 wt. %, 5 wt. % to 75 wt. %, 5 wt. % to 95 wt. %, 10 wt. % to 25 wt. %, 10 wt. % to 50 wt. %, 10 wt. % to 75 wt. %, 10 wt. % to 95 wt. %, 20 wt. % to 50 wt. %, 20 wt. % to 75 wt. %, 20 wt. % to 95 wt. %, 25 wt. % to 50 wt. %, 25 wt. % to 75 wt. %, 25 wt. % to 95 wt. %, 50 wt. % to 75 wt. %, 50 wt. % to 95 wt. %, or 75 wt. % to 95 wt. %); 0 wt. % to about 95 wt. % of one or more water-soluble salts (or non-metal salts) (e.g., about 0 wt. % to 25 wt. %, 0 wt. % to 50 wt. %, 0 wt. % to 75 wt. %, 5 wt. % to 25 wt. %, 5 wt. % to 50 wt. %, 5 wt. % to 75 wt. %, 5 wt. % to 95 wt. %, 10 wt. % to 25 wt. %, 10 wt. % to 50 wt. %, 10 wt. % to 75 wt. %, 10 wt. % to 95 wt. %, 20 wt. % to 50 wt. %, 20 wt. % to 75 wt. %, 20 wt. % to 95 wt. %, 25 wt. % to 50 wt. %, 25 wt. % to 75 wt. %, 25 wt. % to 95 wt. %, 50 wt. % to 75 wt. %, 50 wt. % to 95 wt. %, or 75 wt. % to 95 wt. %); 0 wt. % to about 30 wt. % of one or more additives (e.g., about 0 wt. % to 5 wt. %, 0 wt. % to 10 wt. %, 0 wt. % to 15 wt. %, 0 wt. % to 20 wt. %, 0 wt. % to 25 wt. %, 0.1 wt. % to 5 wt. %, 0.1 wt. % to 10 wt. %, 0.1 wt. % to 15 wt. %, 0.1 wt. % to 20 wt. %, 0.1 wt. % to 25 wt. %, 0.1 wt. % to 30 wt. %, 0.5 wt. % to 5 wt. %, 0.5 wt. % to 10 wt. %, 0.5 wt. % to 15 wt. %, 0.5 wt. % to 20 wt. %, 0.5 wt. % to 25 wt. %, 0.5 wt. % to 30 wt. %, 1 wt. % to 5 wt. %, 1 wt. % to 10 wt. %, 1 wt. % to 15 wt. %, 1 wt. % to 20 wt. %, 1 wt. % to 25 wt. %, 1 wt. % to 30 wt. %, 2 wt. % to 5 wt. %, 2 wt. % to 10 wt. %, 2 wt. % to 15 wt. %, 2 wt. % to 20 wt. %, 2 wt. % to 25 wt. %, 2 wt. % to 30 wt. %, 5 wt. % to 10 wt. %, 5 wt. % to 15 wt. %, 5 wt. % to 20 wt. %, 5 wt. % to 25 wt. %, 5 wt. % to 30 wt. %, 10 wt. % to 15 wt. %, 10 wt. % to 20 wt. %, 10 wt. % to 25 wt. %, 10 wt. % to 30 wt. %, 15 wt. % to 20 wt. %, 15 wt. % to 25 wt. %, 15 wt. % to 30 wt. %, 20 wt. % to 25 wt. %, 20 wt. % to 30 wt. %, or 25 wt. % to 30 wt. %); and 0 wt. % to about 75 wt. % of one or more pigments (e.g., about 0 wt. % to 5 wt. %, 0 wt. % to 10 wt. %, 0 wt. % to 15 wt. %, 0 wt. % to 20 wt. %, 0 wt. % to 25 wt. %, 0 wt. % to 30 wt. %, 0 wt. % to 40 wt. %, 0 wt. % to 50 wt. %, 0 wt. % to 55 wt. %, 0 wt. % to 60 wt. %, 0 wt. % to 65 wt. %, 0 wt. % to 70 wt. %, 1 wt. % to 5 wt. %, 1 wt. % to 10 wt. %, 1 wt. % to 15 wt. %, 1 wt. % to 20 wt. %, 1 wt. % to 25 wt. %, 1 wt. % to 30 wt. %, 1 wt. % to 40 wt. %, 1 wt. % to 50 wt. %, 1 wt. % to 55 wt. %, 1 wt. % to 60 wt. %, 1 wt. % to 65 wt. %, 1 wt. % to 70 wt. %, 1 wt. % to 75 wt. %, 5 wt. % to 10 wt. %, 5 wt. % to 15 wt. %, 5 wt. % to 20 wt. %, 5 wt. % to 25 wt. %, 5 wt. % to 30 wt. %, 5 wt. % to 40 wt. %, 5 wt. % to 50 wt. %, 5 wt. % to 55 wt. %, 5 wt. % to 60 wt. %, 5 wt. % to 65 wt. %, 5 wt. % to 70 wt. %, 5 wt. % to 75 wt. %, 10 wt. % to 15 wt. %, 10 wt. % to 20 wt. %, 10 wt. % to 25 wt. %, 10 wt. % to 30 wt. %, 10 wt. % to 40 wt. %, 10 wt. % to 50 wt. %, 10 wt. % to 55 wt. %, 10 wt. % to 60 wt. %, 10 wt. % to 65 wt. %, 10 wt. % to 70 wt. %, 10 wt. % to 75 wt. %, 20 wt. % to 25 wt. %, 20 wt. % to 30 wt. %, 20 wt. % to 40 wt. %, 20 wt. % to 50 wt. %, 20 wt. % to 55 wt. %, 20 wt. % to 60 wt. %, 20 wt. % to 65 wt. %, 20 wt. % to 70 wt. %, 20 wt. % to 75 wt. %, 25 wt. % to 30 wt. %, 25 wt. % to 40 wt. %, 25 wt. % to 50 wt. %, 25 wt. % to 55 wt. %, 25 wt. % to 60 wt. %, 25 wt. % to 65 wt. %, 25 wt. % to 70 wt. %, 25 wt. % to 75 wt. %, 30 wt. % to 40 wt. %, 30 wt. % to 50 wt. %, 30 wt. % to 55 wt. %, 30 wt. % to 60 wt. %, 30 wt. % to 65 wt. %, 30 wt. % to 70 wt. %, 30 wt. % to 75 wt. %, 40 wt. % to 50 wt. %, 40 wt. % to 55 wt. %, 40 wt. % to 60 wt. %, 40 wt. % to 65 wt. %, 40 wt. % to 70 wt. %, 40 wt. % to 75 wt. %, 50 wt. % to 55 wt. %, 50 wt. % to 60 wt. %, 50 wt. % to 65 wt. %, 50 wt. % to 70 wt. %, 50 wt. % to 75 wt. %, 60 wt. % to 65 wt. %, 60 wt. % to 70 wt. %, 60 wt. % to 75 wt. %, 65 wt. % to 70 wt. %, 65 wt. % to 75 wt. %, or 70 wt. % to 75 wt. %).

In another non-limiting embodiment, the formulation or deposited ink may include a polymer (e.g., PEG, PEO, PVA, PVAc, PMMA, or a combination thereof), a metal powder (e.g., a zinc powder, such as in particle form, in an amount of at least about 5 wt. %), and a metal salt (e.g., a copper salt, such as copper sulfate). In a dry state, the reaction between zinc and the copper salt is prevented, and the deposited ink is non-conducting. Upon exposure to an aqueous environment, as in accidental ingestion, the copper can dissolve to produce copper ions, which in turn can be reduced by the zinc metal to produce copper dendrites that can grow and connect to adjacent dendrites. In this manner, the dendrites provide an electrical connection or a conductive pathway that spans the gap between the anode and the cathode, thereby shorting the cell.

Further exemplary formulations and deposited inks include any of the following.

An exemplary formulation or ink includes a polymer (e.g., PVA, PVAc, and/or PEG), and a metal reactant (including a metal salt, e.g., copper salt, such as copper carbonate or copper sulfate), such as of from about 10 wt. % to about 50 wt. % of a polymer (e.g., PVA) and about 50 wt. % to about 90 wt. % of a metal salt (e.g., a copper salt); or about 30 wt. % of a polymer and about 30 wt. % of a metal reactant (e.g., a metal salt).

Another exemplary formulation or ink includes a first polymer (e.g., PVA, PVAc, and/or PEG), an optional second polymer (e.g., PEO and/or PMMA), a first copper salt (e.g., copper sulfate), and a second copper salt (e.g., copper carbonate), such as of from about 2 wt. % to about 30 wt. % of a first polymer (e.g., PVAc or PVA), 0 wt. % to about 10 wt. % of a second polymer (e.g., PEO), 0 wt. % to about 60 wt. % of a first copper salt (e.g., copper sulfate), and about 50 wt. % to about 95 wt. % of a second copper salt (e.g., copper carbonate); about 12 wt. % of a first polymer (e.g., PVAc), about 5 wt. % of a second polymer (e.g., PEO), about 8 wt. % of a first copper salt (e.g., copper sulfate), and about 75 wt. % of a second copper salt (e.g., copper carbonate); about 13 wt. % of a first polymer (e.g., PVAc), about 4 wt. % of a second polymer (e.g., PEO), about 8 wt. % of a first copper salt (e.g., copper sulfate), and about 75 wt. % of a second copper salt (e.g., copper carbonate); about 17 wt. % of a first polymer (e.g., PVAc), about 6 wt. % of a second polymer (e.g., PEO), about 13 wt. % of a first copper salt (e.g., copper sulfate), and about 64 wt. % of a second copper salt (e.g., copper carbonate); about 16 wt. % of a first polymer (e.g., PVAc), about 42 wt. % of a first copper salt (e.g., copper sulfate), and about 42 wt. % of a second copper salt (e.g., copper carbonate); or about 16 wt. % of a first polymer (e.g., PVA), about 42 wt. % of a first copper salt (e.g., copper sulfate), and about 42 wt. % of a second copper salt (e.g., copper carbonate).

Another exemplary formulation or ink includes a polymer (e.g., PVA, PVAc, and/or PEG), a first metal reactant (e.g., a metal powder, such as zinc powder; or a copper salt, such as copper carbonate), and a second metal reactant (e.g., a metal salt, including a copper salt, such as copper sulfate), such as of from about 10 wt. % to about 95 wt. % of a polymer (e.g., PEG), about 5 wt. % to about 60 wt. % of a first metal reactant (e.g., a metal powder), and about 5 wt. % to about 60 wt. % of a second metal reactant (e.g., a metal salt); about 80 wt. % of a polymer (e.g., PEG), about 10 wt. % of a first metal reactant (e.g., zinc powder or particle), and about 10 wt. % of a second metal reactant (e.g., a copper salt); about 70 wt. % of a polymer (e.g., PEG), about 15 wt. % of a first metal reactant (e.g., zinc powder or particle), and about 15 wt. % of a second metal reactant (e.g., a copper salt, such as copper sulfate in powder or particle form); or about 16 wt. % of a polymer (e.g., PVA), about 42 wt. % of a first metal reactant (e.g., copper carbonate, zinc powder, or zinc particles), and about 42 wt. % of a second metal reactant (e.g., copper sulfate). In any of these formulations, an additive may be present (e.g., of from about 5 mg/mL to about 30 mg/mL of an additive, such as a stabilizer, including a fumed silica).

Another exemplary formulation or ink includes a first polymer (e.g., PVA, PVAc, and/or PEG), a second polymer (e.g., PMMA), a first metal reactant (e.g., a metal powder, such as zinc powder; or a copper salt, such as copper carbonate), and a second metal reactant (e.g., a metal salt, including a copper salt, such as copper sulfate), such as of from about 10 wt. % to about 95 wt. % of a first polymer (e.g., PEG), about 1 wt. % to about 10 wt. % of a second polymer (e.g., PMMA), about 5 wt. % to about 60 wt. % of a first metal reactant (e.g., a metal powder), and about 5 wt. % to about 60 wt. % of a second metal reactant (e.g., a metal salt); or about 20 wt. % of a first polymer (e.g., PEG), about 2 wt. % of a second polymer (e.g., PMMA), about 38 wt. % of a first metal reactant (e.g., a metal powder, such as zinc powder), and about 38 wt. % of a second metal reactant (e.g., a metal salt, such as a copper salt, including copper sulfate).

Another exemplary formulation or ink includes a polymer (e.g., PVA, PVAc, and/or PEG), a first metal reactant (e.g., a metal powder, such as zinc powder; or a copper salt, such as copper carbonate), a second metal reactant (e.g., a metal salt, including a copper salt, such as copper sulfate), an additive (e.g., any herein, such as those including silica, fumed silica, alumina, titania, or combinations thereof), and a pigment (e.g., any herein); such as of from about 5 wt. % to about 85 wt. % of a polymer (e.g., PVA, PVAc, and/or PEG), about 5 wt. % to about 60 wt. % of a first metal reactant (e.g., a metal powder or a metal salt), about 5 wt. % to about 60 wt. % of a second metal reactant (e.g., a metal salt), about 0.1 wt. % to about 5 wt. % of an additive (e.g., any herein, such as those including silica, fumed silica, alumina, and/or titania), and about 5 wt. % to about 40 wt. % of a pigment (e.g., carbon black); or about 12 wt. % of a polymer (e.g., PVA), about 31 wt. % of a first metal reactant (e.g., a first metal salt, such as a copper salt, including copper sulfate), about 31 wt. % of a second metal reactant (e.g., a second metal salt such as a copper salt, including copper carbonate), about 2 wt. % of an additive (e.g., any herein, such as those including silica, fumed silica, alumina, and/or titania), and about 24 wt. % of a pigment (e.g., carbon black).

In any formulation or ink herein, an additive may be present (e.g., of from about 5 mg/mL to about 30 mg/mL of an additive; or of from about 0.1 wt. % to about 5 wt. % of an additive, in which the additive can be a stabilizer, such as a fumed silica). An exemplary formulation or ink includes of from about 2 wt. % to about 30 wt. % of a first polymer (e.g., PVAc or PVA), 0 wt. % to about 10 wt. % of a second polymer (e.g., PEO), 0 wt. % to about 60 wt. % of a first copper salt (e.g., copper sulfate), about 50 wt. % to about 95 wt. % of a second copper salt (e.g., copper carbonate), and about 0.1 wt. % to about 5 wt. % of an additive (e.g., silica, including particle forms thereof and/or fumed silica); about 17 wt. % of a first polymer (e.g., PVA), about 41 wt. % of a first copper salt (e.g., copper sulfate), about 41 wt. % of a second copper salt (e.g., copper carbonate), and about 1 wt. % of an additive (e.g., silica, including fumed silica); or about 16 wt. % of a first polymer (e.g., PVA), about 41 wt. % of a first copper salt (e.g., copper sulfate), about 41 wt. % of a second copper salt (e.g., copper carbonate), and about 2 wt. % of an additive (e.g., silica, including fumed silica).

In any formulation or ink herein, a pigment may be present (e.g., of from about 10 wt. % to about 40 wt. % of a pigment). An exemplary formulation or ink includes one or more polymers (e.g., PVA, PVAc, PEG, and/or PEO), a metal reactant (including a metal salt, e.g., copper salt, such as copper carbonate or copper sulfate), and a pigment, such as of from about 5 wt. % to about 50 wt. % of a polymer (e.g., PVA), about 30 wt. % to about 90 wt. % of a metal salt (e.g., a copper salt), and about 10 wt. % to about 40 wt. % of a pigment; about 2 wt. % to about 30 wt. % of a first polymer (e.g., PVA, PVAc, and/or PEG), 0 wt. % to about 10 wt. % of a second polymer (e.g., PEO), 0 wt. % to about 60 wt. % of a first copper salt (e.g., copper sulfate), about 50 wt. % to about 95 wt. % of a second copper salt (e.g., copper carbonate), and about 10 wt. % to about 40 wt. % of a pigment; about 10 wt. % to about 95 wt. % of a polymer (e.g., PVA, PVAc, and/or PEG), about 5 wt. % to about 60 wt. % of a first metal reactant (e.g., a metal powder, such as zinc powder; or a copper salt, such as copper carbonate), about 5 wt. % to about 60 wt. % of a second metal reactant (e.g., a metal salt, including a copper salt, such as copper sulfate), and about 10 wt. % to about 40 wt. % of a pigment; about 10 wt. % to about 95 wt. % of a first polymer (e.g., PVA, PVAc, and/or PEG), about 1 wt. % to about 10 wt. % of a second polymer (e.g., PMMA), about 5 wt. % to about 60 wt. % of a first metal reactant (e.g., a metal powder, such as zinc powder; or a copper salt, such as copper carbonate), about 5 wt. % to about 60 wt. % of a second metal reactant (e.g., a metal salt, including a copper salt, such as copper sulfate), and about 10 wt. % to about 40 wt. % of a pigment; or about 5 wt. % to about 85 wt. % of a polymer (e.g., PVA, PVAc, and/or PEG), about 5 wt. % to about 60 wt. % of a first metal reactant (e.g., a metal powder or a metal salt), about 5 wt. % to about 60 wt. % of a second metal reactant (e.g., a metal salt), about 0.1 wt. % to about 5 wt. % of an additive (e.g., any herein, such as those including silica, finned silica, alumina, and/or titania), and about 5 wt. % to about 40 wt. % of a pigment.

The components of the formulation (or deposited ink) can include any useful amount of an agent. In one non-limiting embodiment, the formulation (or deposited ink) includes a first metal reactant and a second metal reactant in a ratio of 1:1 (e.g., by weight). In another embodiment, the formulation (or deposited ink) include a metal salt and a metal reducing agent in a ratio of 1:1 (e.g., by weight). In yet another embodiment, the formulation (or deposited ink) include a first metal salt and a second metal salt in a ratio of 1:1 (e.g., by weight). In another embodiment, the formulation (or deposited ink) include a metal salt and a metal powder in a ratio of 1:1 (e.g., by weight). In another embodiment, the formulation (or deposited ink) include a metal salt and a water-soluble salt (non-metal salt) in a ratio of 1:1 (e.g., by weight).

The formulation can have any useful physical characteristic, such as viscosity. The desired method of dispensing can influence the optimal viscosity of the formulation. In one non-limiting embodiment, the formulation is configured for printing (e.g., direct writing), in which the viscosity (e.g., obtained at high shear rate) is of from about 100 cP to about 5000 cP (as measured at room temperature, e.g., of from about 20° C. to 25° C.). In another non-limiting embodiment, the formulation is configured for spraying (e.g., aerosol or ink jet spraying), in which the viscosity is of from about 1 cP to about 50 cP (as measured at room temperature, e.g., of from about 20° C. to 25° C.). In yet another non-limiting embodiment, the formulation is configured for contact printing (e.g., gravure methods), in which the viscosity is of from about 10 cP to about 100 cP (as measured at room temperature, e.g., of from about 20° C. to 25° C.).

The formulation can be prepared in any useful manner. Any component within the formulation or the formulation itself can be processed, such as by way of homogenization (e.g., milling, powdering, grinding, etc.), separation (e.g., by size exclusion, chromatography, etc.), sterilization (e.g., washing, etc.), and/or reaction (e.g., by exposure to reducing or oxidizing conditions). In one non-limiting instance, the polymer is dissolved in a solvent or solvent mixture (e.g., acetone, xylenes, toluene, etc.) at an elevated temperature (e.g., above 25° C., such as of from about 30° C. to 70° C.); and then additional components (e.g., metal agents (optionally milled), optional additives, pigments, etc.) are included in one or more steps. Optionally, the resulting composition can be mixed with another solvent (e.g., terpineol) to adjust viscosity. The formulation can be optionally cooled prior to deposition on a surface.

The formulation can be dispensed or deposited (e.g., printed by way of direct write, aerosol deposition, ink jet deposition, contact printing, etc.) in any useful manner. The dispensed formulation can then be dried (e.g., more than 24 hours at ambient temperature, such as from about 20° C. to 30° C.).

Batteries

The present invention can be used to prepare a safety battery by depositing an ink formulation (e.g., any herein) upon a surface of an initial battery. Any useful initial battery can be employed. In one instance, the battery can include any useful type of cathode materials, anode materials, and electrolytes, such as zinc, zinc oxide, lithium, nickel oxyhydroxide, mercury, manganese dioxide, oxygen, silver oxide, carbon monofluoride, copper oxide, mercuric oxide, carbon dioxide, potassium hydroxide, sodium hydroxide, and combinations thereof.

The initial battery can be any useful size or configuration or format, such as a button cell, coin cell, cylindrical cell, watch battery, including primary cells (non-rechargeable batteries) and secondary cells (rechargeable batteries). Exemplary types of batteries include AAAA, AAA, AA, B, C, D, 9V, CR2, CR123A, 1/3N, 2016 lithium, 2032 lithium, CR2040, CR2032, CR2025, CR2020, CR2016, CR2012, CR2354, BR2335, CR2330, CR2325, CR2320, CR2477, CR2450, CR2430, CR2414, or CR3032.

In one non-limiting embodiment, the initial battery is a coin-size battery having a diameter that is ≥20 mm (e.g., a diameter of from about 20 mm to about 25 mm, such as for a 3-volt lithium coin-size battery). In another non-limiting embodiment, the initial battery is a coin-size battery having a diameter that is of from about 5 mm to about 25 mm (e.g., a diameter of about 6 mm, about 8 mm, about 11 mm, about 12 mm, about 20 mm, about 25 mm, or any ranges therein).

In other embodiments, the initial battery is a round or cylindrical battery (e.g., a lithium manganese dioxide battery having a nominal voltage of about 3V) having a diameter of about 20 mm. In some embodiments, the initial battery has a height of about 3 mm (e.g., about 3.2 mm, such as for a CR2032 lithium round battery having a diameter of about 20±0.25 mm and a height of about 3.2 mm); about 2.5 mm (e.g., such as for a CR2025 battery lithium round battery having a diameter of about 20±0.25 mm and a height of about 2.5 mm); or about 1.6 mm (e.g., such as for a CR2016 battery lithium round battery having a diameter of about 20±0.25 mm and a height of about 1.6 mm).

A surface of the battery may be pre-treated prior to providing a safety ink formulation. In one non-limiting instance, the surface may be activated by any suitable activation technique (e.g., with plasma treatment including but not limited to argon, oxygen, or corona treatments; UV/ozone treatment; flame treatment; chemical treatment, including but not limited to acid treatments or base treatments; and the like). Such treatment prior to deposition may increase adhesion of the safety ink formulation to the battery surface. Yet another non-limiting instance, an interlayer may be present between the surface of the battery and the deposited safety ink formulation, in which the interlayer can serve as an adhesion layer (e.g., composed of a polymer, a primer (e.g., including a silane, such as an acryloxysilane, a methacryloxysilane, an epoxysilane, a vinylsilane, a silanetriol, an alkoxysilane, or an aminosilane, such as 3-acryloxypropyl trimethoxysilane, 3-methacryloxypropyl methyldimethoxysilane, 3-methacryloxypropyl trimethoxysilane, 3-methacryloxypropyl methyldiethoxysilane, 3-methacryloxypropyl triethoxysilane, (3-glycidoxypropyl)methyldimethoxysilane, (3-glycidoxypropyl) trimethoxysilane, (3-glycidoxypropyl)triethoxysilane, vinyltrimethoxysilane, vinyltriethoxysilane, glycidoxypropylsilanetriol, tris(3-trimethoxysilylpropyl)isocyanurate, bis[3-(triethoxysilyl)propyl]tetrasulfide, N-(2-aminoethyl)-3-aminopropylsilanetriol, [3-(1-piperazinyl)propyl]methyldimethoxysilane, and tris(triethoxysilylpropyl)amine), or a safety ink formulation such as any described herein).

EXAMPLES

Example 1: Methods to Print on Batteries

Described herein are methods of depositing reactive materials that will passivate a battery following exposure to moisture, such as can occur upon ingestion. One non-limiting requirement for deposition of these safety materials includes a physical connection between the anode and cathode of the coin cell, which is separated by a spacer on the outer perimeter of the battery. This spacing is approximately 500 µm in width.

One non-limiting deposition method includes extrusion printing or direct ink printing, in which a safety ink formulation is extruded downward from syringe using an automated, mechanical plunger onto a battery while mechanically translating either the syringe or the battery during deposition. For a battery having a circular periphery (e.g., for a coin cell), translation can include use of a circular motion during deposition. Using inks with appropriate rheological properties, deposition can be performed from any orientation (upward, downward, sideways, etc.) to facilitate incorporation of this unit operation in a production line.

Non-limiting modifications to any ink formulation herein can include adapting to other printing processes, including, e.g., ink jetting, aerosol, spray painting, or stamping. Furthermore, the ink formulation can be pre-formed/cured into a putty or onto a stamp or sticker (e.g., as a thin film) and then deposited or placed on a battery using a manual or automated process. If desired, masks can be employed to protect portions of the battery from deposition of the ink formulation. Additional details and experiments are described herein.

Example 2: Microdispensing Approaches for Battery Passivation

Concurrent to the development and optimization of the safety ink for coin cell battery passivation, we evaluated printing strategies to deposit materials on the battery. Here, we describe direct write ink print (extrusion printing) methods. Such methods can be employed as a single-step approach to deliver safety materials on a fully assembly battery.

Figure 6A:
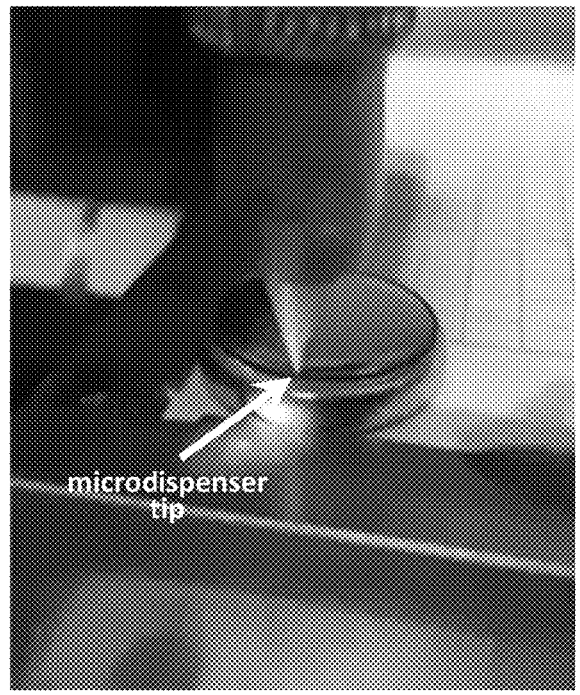
FIG. 6A-6C shows an exemplary microdispensing approach for printing on a battery. Provides are images of (A) the tip of the dispenser, which can be translated around the perimeter of the battery to dispense the formulation within the spaced gap (B) with high resolution (C).
Figure 6B:
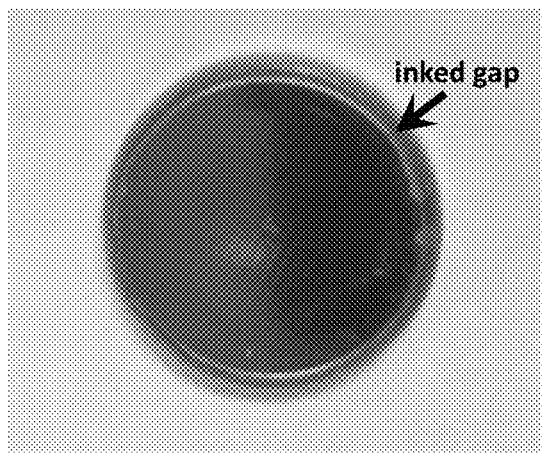
Figure 6C:
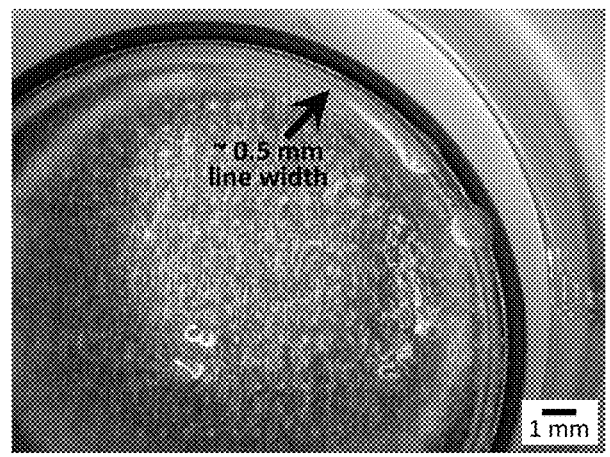

We evaluated a microdispensing approach using a commercial instrument (nScrypt, nScrypt, Inc., Orlando, Fla.). Microdispensing uses a precision syringe dispenser to enable stop/start and continuous flow of materials from a wide range of materials and viscosities (e.g., tens of cP to millions of cP). An exemplary tested formulation includes (in solid wt. %): 22 wt. % PEG 6K (having a weight average MW of about 6000); 2 wt. % PMMA 75 k (having a weight average MW of about 75000); 38 wt. % Zn (Zn powder); and 38 wt. % $CuSO_4$ (particles) dissolved in acetone to yield a low viscosity ink. Then, terpineol was added to increase the viscosity (e.g., to about 100 cP to about 1000 cP), and the method was demonstrated on batteries (see, e.g., FIG. 6A-6C). Any useful solvent can be employed to obtain optimal viscosity for microdispensing, such as, e.g., xylene.

After microdispensing (e.g., by direct write), the deposited formulation can be further treated. In one non-limiting embodiment, the battery having the microdeposited formulation can be spun, which results in further depositing the formulation across the peripheral edge of the battery. The resulting printed, spin-coated formulation can provide a thinner coating distributed over a greater surface area of the battery (see, e.g., FIG. 2C), as compared to a printed formulation (see, e.g., FIG. 2B). In one non-limiting embodiment, the formulation includes 29 wt % PVAc 100K (polyvinyl acetate having a weight average MW of about 100,000) and 71 wt. % $CuSO_4$ (particles) dissolved in xylenes and including a pigment (e phthalo blue).

Example 3: Aerosol and Ink Jet Deposition Approaches for Battery Passivation

Other deposition approaches were evaluated, including aerosol printing. Such aerosol jet printing methods can be optimized to provide high resolution printing of features (e.g., about 10 to about 20 microns) using an aerosolized 'nano-ink' focused via sheath flow. Such ink formulations can include any useful characteristics, e.g., colloidal dispersion on a nanoscale, nanoparticle- or microparticle-sized metal reactant(s), and/or low viscosity (e.g., of from about 1 cP to about 10 cP employing an ultrasonic atomizer; or from 1 cP to 1000 cP employing a pneumatic atomizer).

Figure 7A:
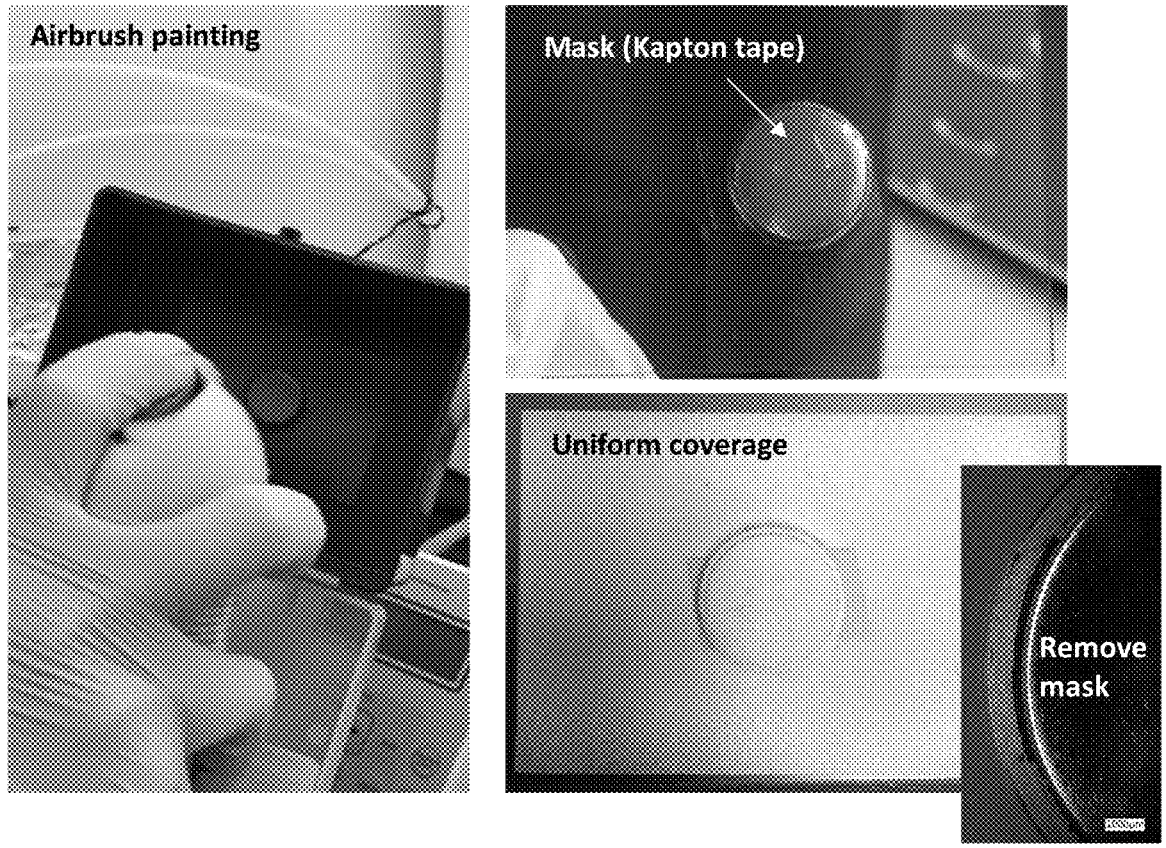
FIG. 7A-7C provides an exemplary aerosol deposition approach for printing on a coin cell battery. Provided are images of (A) use of an airbrush kit with masking to print on a battery and optical microscope images of the ink (B) before and (C) after exposure to water.
Figure 7B:
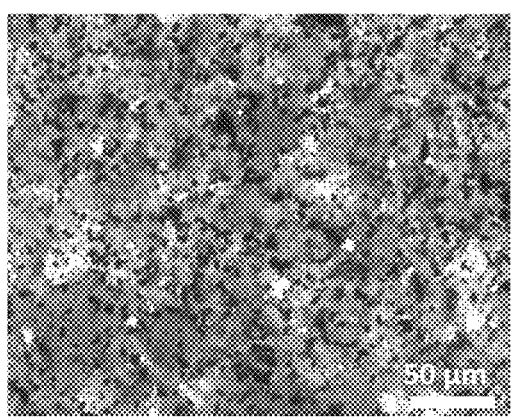
Figure 7C:
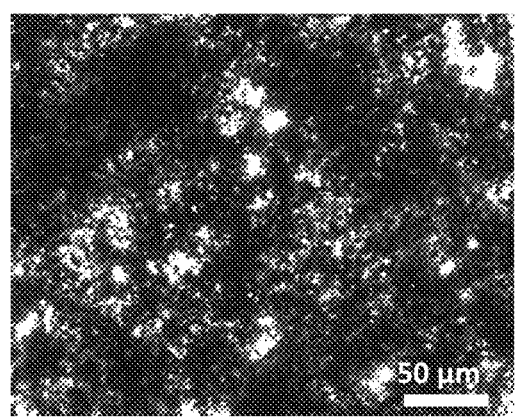

An alternative aerosol deposition method can include use of an airbrush employing any useful formulation. One non-limiting formulation includes kit (in solid wt. %): 17 wt. % PVAc 100K (polyvinyl acetate having a weight average MW of about 100,000); 41.5 wt. % Zn (particles, provided as a powder); and 41.5 wt. % $CuSO_4$. (particles) dissolved in xylenes. As shown in FIG. 7A-7C, this approach can provide uniform printing of material. Optionally, a mask (e.g., using tape) can be used to restrict printing to the perimeter gap of the battery. Upon removing the mask, only the exposed area will include deposited formulation.

Droplet-on-demand methods such as ink jet printing can provide another way to direct write onto the battery gap. Importantly, these methods are limited by the range of viscosity required for a successful print (typically, e.g., about 10 cP). Exemplary methods can include use of a mask, as well as any formulation described herein.

Example 4: Contact Printing Approaches for Battery Passivation

Figure 8A:
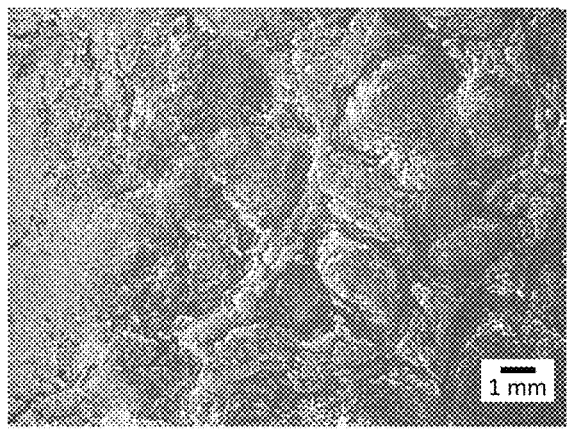
FIG. 8A-8C provides exemplary contact printing approaches. Provided are images of $CuSO_2$ particles (A) as received and (B) after ball mill homogenization. Also provided is (C) an image an ink formulation disposed on a sticker backing layer by contact printing.
Figure 8B:
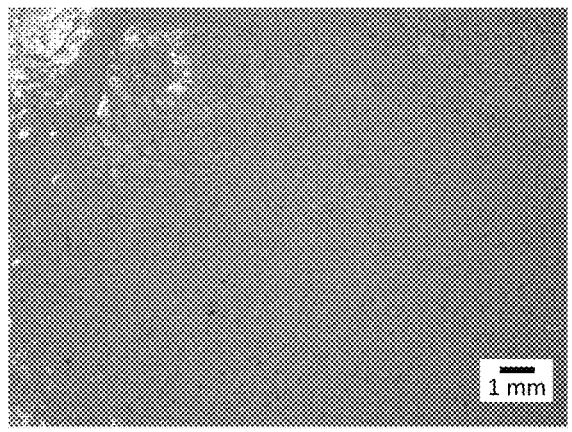

For any method herein, the safety ink formulation generally includes a metal reactant. This metal reactant can be used as received or be treated to provide beneficial ink properties. In one non-limiting embodiment, the metal reactant can be homogenized (e.g., by use of a ball mill) to provide uniformly sized particles having desired particulate dimensions. FIG. 8A-8B provides an exemplary metal reactant (A) before and (B) after homogenization.

Figure 8C:
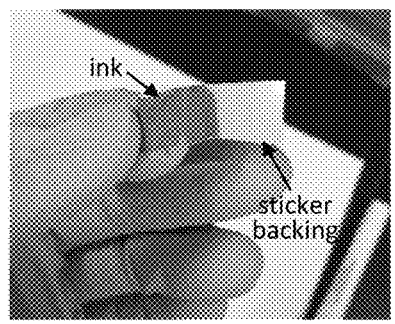

Ink formulations can be provided directly onto the battery surface or printed indirectly by use of contact printing onto a sacrificial layer. In one non-limiting instance, contact printing can be used to form a thin film of the formulation disposed on a sacrificial, removable backing layer (FIG. 8C). The thin film and backing layer, akin to a sticker, can then be positioned and adhered to the desired location of the battery. Next, the backing layer is removed, thereby providing a thin film disposed on the battery gap (or separated region). Optionally, a mask can be first placed on a surface of the battery to determine the pattern of the printed region.

Figure 9A:
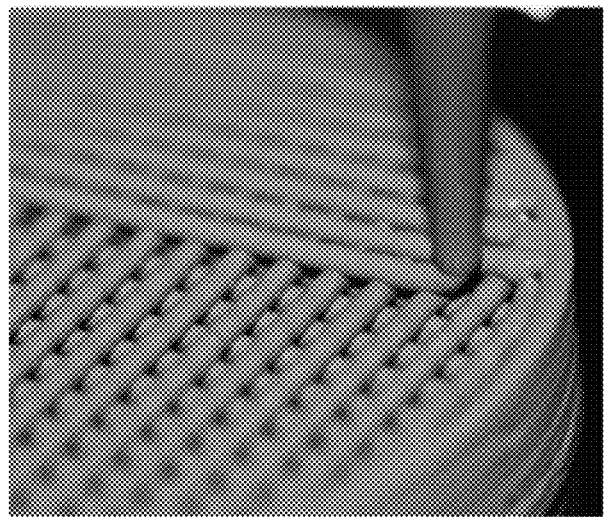
FIG. 9A-9D shows an exemplary direct ink writing (also known as extrusion printing and robocasting) approach to dispense high viscosity precursors. Provided are images for (A) 3D printing of a viscous precursor, (B) an exemplary experimental setup for dispensing an ink formulation from a syringe while (C) the stage is rotated at a constant rate. Also provided are (D) images of coin cell battery before and after immersion.
Figure 9B:
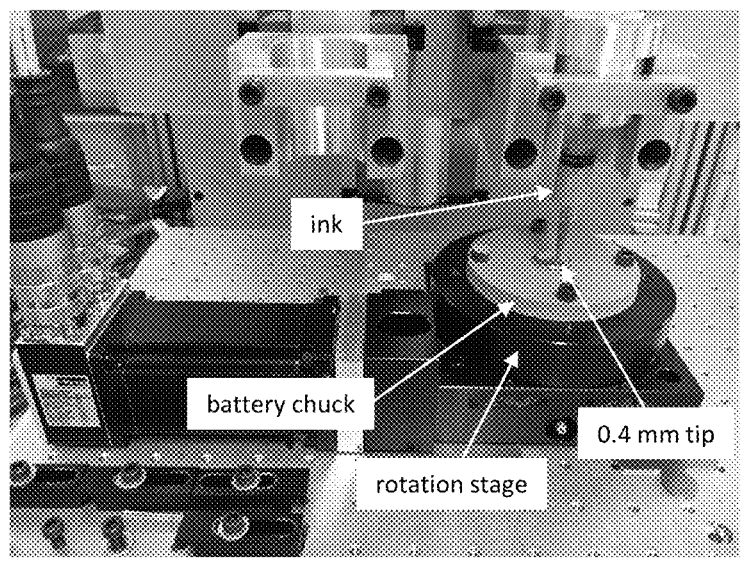

Example 5: Direct Ink Writing (Extrusion Printing) Approaches for Battery Passivation Direct ink printing can be employed to provide both two-dimensional and three-dimensional patterns of an ink formulation. In such an approach, an ink is extruded from a syringe using an automated, mechanical plunger (see, e.g., FIG. 9A). Such an approach can be used to print a wide range of materials including soft, deformable, and hydrogel materials, ceramics, food products, and electronic inks. Formulations of various properties can be accommodated, such as a viscosity ranging from about 100 cP to about 150,000,000 cP. Direct printing on the battery can be accomplished by mechanically translating the dispenser and/or the battery in a circular motion to deposit the formulation. Dispensers can be designed to deliver up to 1500 lbs of force, and motion control can be automated via custom software to allow for deposition at any orientation (upward, downward, sideways, etc.). FIG. 9B shows an exemplary printing platform.

Figure 9C:
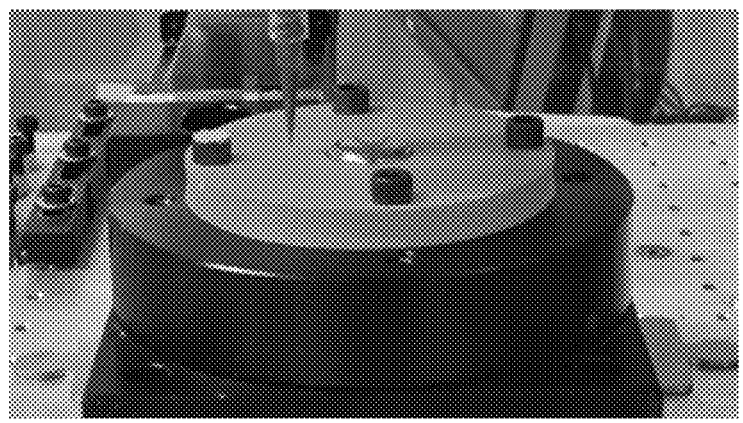

In one non-limiting embodiment, we found that using a stage to rotate the battery (see, e.g., FIG. 9C) in relation to the print head resulted in fast, reproducible prints while generating little material waste (as opposed to translating the print head). Further, a suitable amount of material can be dispensed in a single pass. Batteries printed using this method with an optimized ink formulation resulted in uniform coverage of the gap with few cosmetic flaws. The average measured voltage of batteries included about 3.34V before printing and about 3.34V after printing (n=36).

Figure 9D:
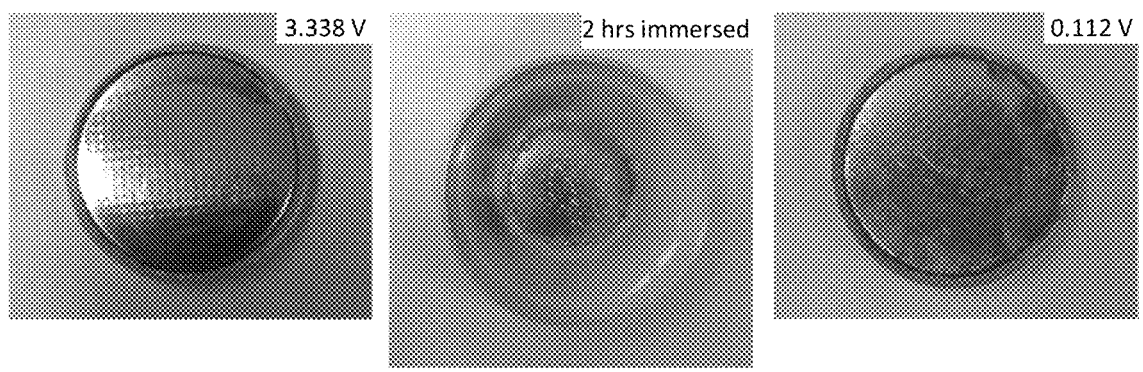

Printed batteries exhibited passivation when exposed to moisture. As seen in FIG. 9D, a printed battery exhibited a measured voltage of about 3.338V. The exposure test included 2 hours of full immersion in an aqueous solution, after which the exposed, printed battery provided a measured voltage of about 0.112V. In one non-limiting embodiment, the formulation includes 17 wt % PVA, 500 k; 41.7 wt. % $CuSO_4$; and 41.7 wt. % $CuCO_4$ dissolved in xylenes.

Example 6: Consideration of Ink Components

Ink components (e.g., metal reactants, polymers, metal salts, etc.) can be further processed (e.g., milled, ground, chemically treated, separated, sorted, recrystallized, etc.) prior to formulation. In particular, non-limiting embodiments, particle size can be reduced by employing a mill (e.g., a ball mill in the presence or absence of a solvent).

Figure 10A:
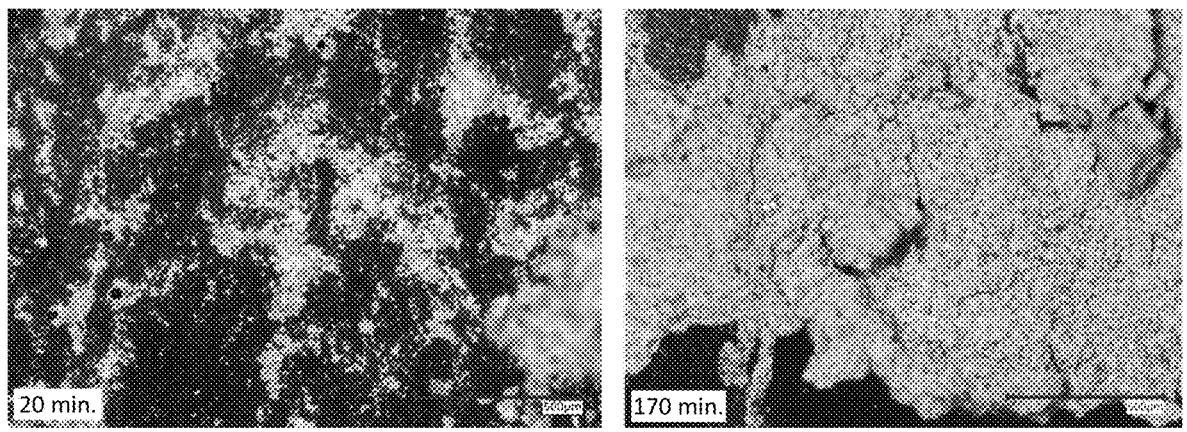
FIG. 10A-10B shows the effect of milling on an exemplary metal reactant. Provided are (A) images of $CuCO_3$ that was ball milled in acetone for 20 minutes (left) or for 170 minutes (right), thereby resulting in a homogenous powder. Also provided are (B) XRD spectra of the material before and after milling, which indicated no chemical transformation of the materials. Arrows indicate XRD peaks characteristics of a pure malachite sample ($Cu_2(OH)_2CO_3$ or $CuCO_3.Cu(OH)_2$).
Figure 10B:
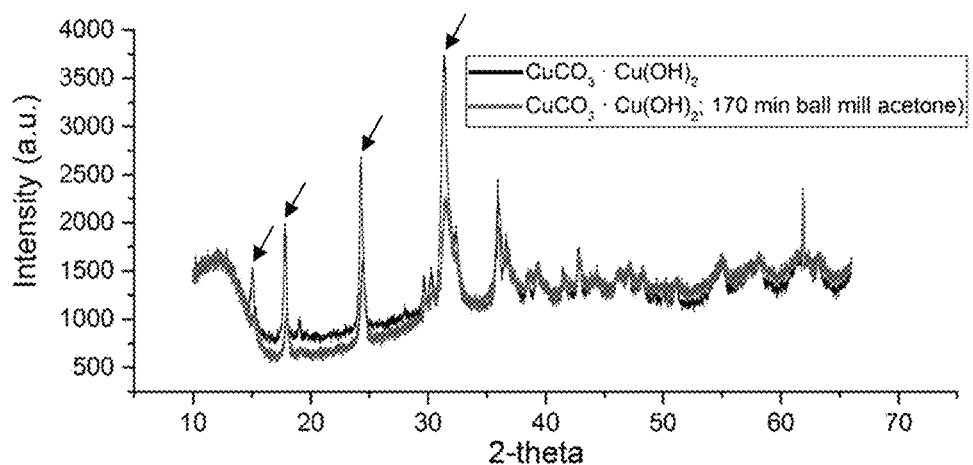
Figure 11:
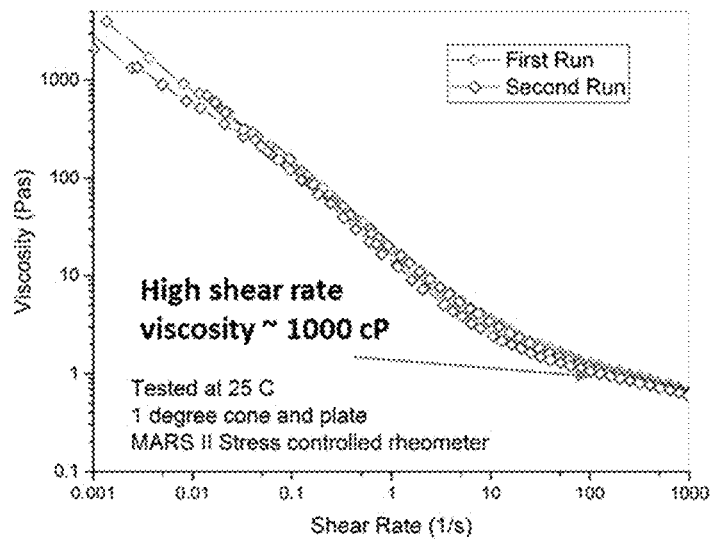
FIG. 11 shows rheological properties of an exemplary formulation including a dry milled metal reactant. Provided is a viscosity/shear rate curve indicating a viscosity of about 1000 cP (at high shear). The formulation includes 12 wt. % PVA, 500 k; 31 wt. % $CuSO_4$; 31 wt. % $CuCO_3$; 2 wt. % Aerosil®-200; and 24 wt. % carbon black pigment.

In one example, copper salts, in particular $CuCO_3$, were further milled to obtain reduced particle sizes. If desired, further fractionation can be performed to exclude particles above a certain particle size. As received, the $CuCO_3$ material included microparticles having an average particle size of about 40 μm. We employed a Netzsch table top ball mill with a 50 ml volume to reduce the particle size. Wet milling in the presence of a solvent (acetone) reduced the particle size (e.g., by about 1-2 μm after milling for 170 minutes) and homogenized the material (FIG. 10A). An X-ray diffraction (XRD) spectra of pre- and post-milled material indicated no chemical transformation following milling (FIG. 10B). Combined with dry milled $CuSO_4$ (for 30 minutes) and a thixotropic agent, the resulting ink displayed rheological properties (e.g., predictable shear thinning and no hysteresis) indicative of a well-dispersed colloidal ink (FIG. 11).

Figure 12:
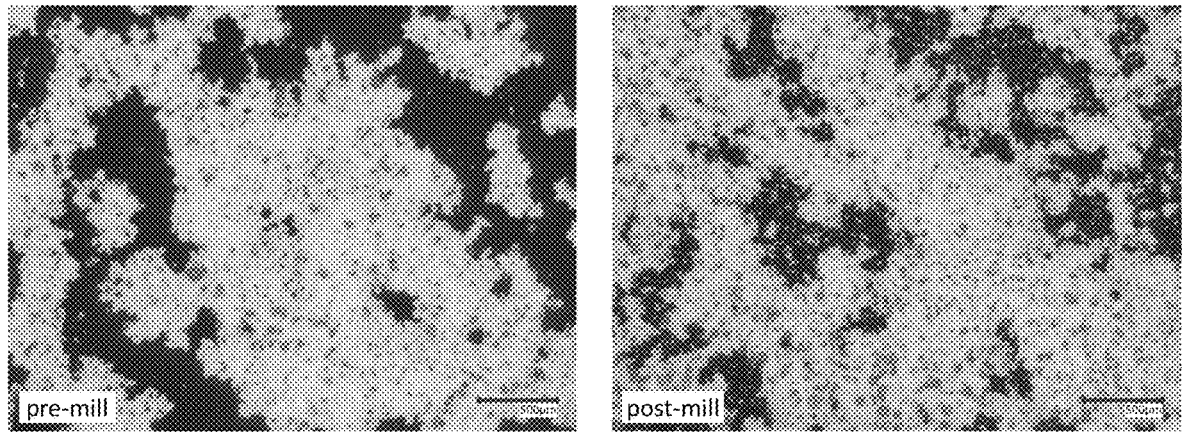
FIG. 12 shows the effect of milling on an exemplary mixture of two metal agents. Provided are images of a 1:1 mixture of $CuSO_4$:$CuCO_3$ before milling (left, average particle diameter of 39±11 μm for $CuCO_3$) and after dry milling (30 Hz) in separate batches for 20 minutes (right, average particle diameter of 25±8 μm for $CuCO_3$).

Metal agents can be milled in any useful manner (e.g., in the presence of a solvent or in the absence of a solvent). Furthermore, one or more metal agents can be combined and then milled together. FIG. 12 provides images of a 1:1 mixture of $CuSO_4$:$CuCO_3$ (dried from xylene) before and after milling for 20 minutes.

Example 7: Effect of Additives on Ink Formulation

The ink formulation can be optimized to include one or more additives to provide desired particle dispersion properties, viscosities, etc. By modifying the rheological properties of the ink formulation, resolution of printed features can be enhanced. In one non-limiting embodiment, the formulation can include an anti-settling, thickening agent (e.g., a fumed silica excipient, such as CAB-O-SIL®).

Figure 13A:
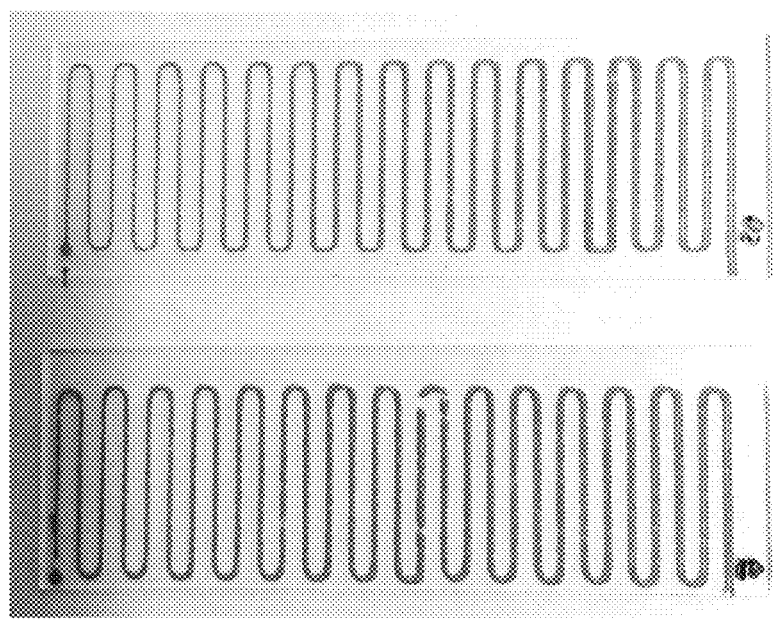
FIG. 13A-13C shows the effect of an additive on ink formulations, Provided are (A) images of printed structures for a formulation having 20 mg/mL, (top) or 10 mg/mL (bottom) of CAB-O-SIL® EH5. Also provided are images of line features produced by the ink formulation having (B) 20 mg/mL, of CAB-O-SIL® EH5 (line width of 390±35 μm) or (C) 10 mg/mL of CAB-O-SIL® EH5 (line width of 440±50 μm).
Figure 13B:
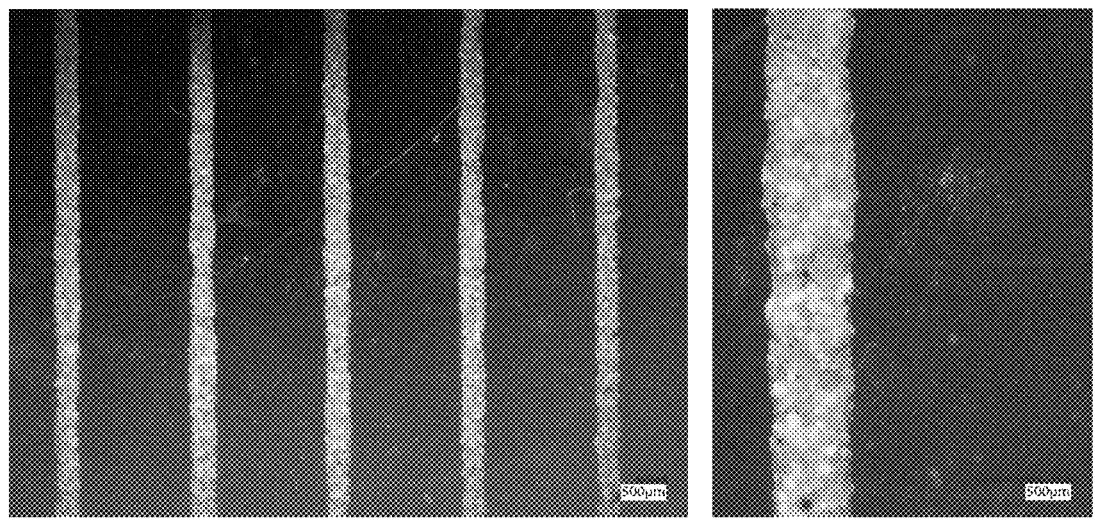
Figure 13C:
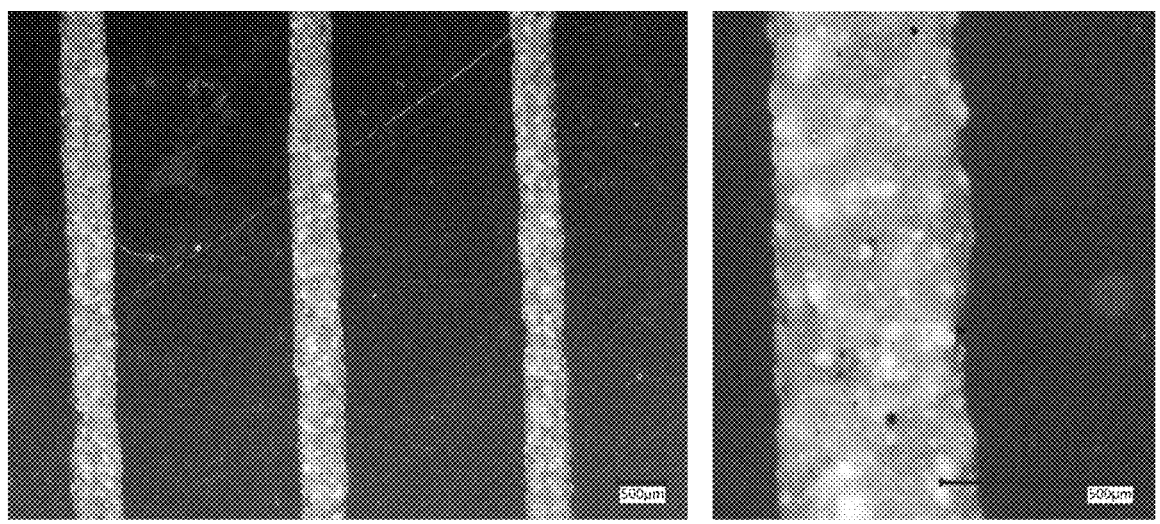

FIG. 13A provides images of printed structures with a formulation having 20 mg/mL of CAB-O-SIL® EH5 (top) or 10 mg/mL of CAB-O-SIL® EH5 (bottom). Structures were printed in a single-pass with a 0.4 mm diameter tip. Higher resolution features were obtained with the formulation including 20 mg/mL of the additive (FIG. 13B-13C). Formulations included 1 g of PVAc 500K (polyvinyl acetate having a weight average MW of about 500,000); 2.5 g of $CuSO_4$ (particles); 2.5 g of $CuCO_3 \cdot Cu(OH)_2$(particles); and either 50 or 100 mg of CAB-O-SIL® EH5 for a 5 mL volume.

Example 8: Further Formulations

Also provided herein are further exemplary formulations and their components (Table 1).

TABLE 1

Composition of Formulations A-D

| Component | A (black) | B (copper) | C (green) | D (black) |
|---|---|---|---|---|
| Polyvinylacetate, 500 kD | ~13.88% | ~14.91% | ~16.11% | ~12.19% |
| Copper sulfate | ~34.69% | ~37.26% | ~40.28% | ~30.46% |
| Basic copper carbonate | ~34.69% | ~37.26% | ~40.28% | ~30.46% |
| Aerosil ®-200 | ~2.08% | ~2.24% | ~2.42% | ~1.83% |
| APTES | ~0.79% | ~0.89% | ~0.91% | ~0.69% |
| Carbon Black, Pearl EX (Jacquard Products) | ~13.88% | — | — | — |
| Super Copper, Pearl EX (Jacquard Products) | — | ~7.46% | — | — |
| Titan Black (Uniglobe Kisco, Inc.) | — | — | — | ~24.37% |

All reagents can be used as-received without further treatment or purification. To give the formulations desirable rheological and anti-settling properties, however, the basic copper carbonate was first dispersed in a solvent (acetone) and then ball-milled wet (Retsch Mixer Mill MM200, Retsch GmbH) for 2 hours to reduce the particle size to between about 1-30 After filtering the resulting slurry, the solid was placed into a container and dried (air or vacuum). Copper sulfate was ball milled dry for 30 min. Copper sulfate and (3-aminopropyl) triethoxysilane (APTES) were stored in a desiccator until use.

In a 20 mL glass vial with a Teflon-coated magnetic micro-stir bar, 200 mg of PVAc (500 kD) was dissolved in 2 mL of toluene with continuous stirring on a magnetic stir-plate for each of formulations A-D. When the PVAc was completely dissolved (up to 1 h), the basic copper carbonate (500 mg), copper sulfate (500 mg), colorant (200 mg Carbon Black, 100 mg Super Copper, or 400 mg Titan Black, in Formulations A, B, and D, respectively, with Formulation C not including any additional pigment), and Aerosil®-200 (30 mg) were added and mixed for 5-10 min. to produce a uniformly dispersed slurry. Upon storage in a desiccator or other moisture-free environment, the mixture demonstrated stability for at least one week. If settling occurs vigorous stirring/mixing is sufficient to re-disperse the solid components in the mixture.

Surfaces were cleaned and activated to enhance adhesion. As-received cells were cleaned and activated using a UV/ozone treatment for several minutes. Sufficient activation was confirmed when a drop of deionized water easily wets an activated surface and has a contact angle of less than 10 degrees. Activated surfaces were coated as soon as possible after activation (within an hour for best results) with formulations that were mixed to resuspend all the components (5-10 min). APTES was added to (otherwise complete) formulations shortly before deposition and the formulations were stirred for another 5 min. Typical deposition volumes are between 10-15 μL and not more than 20 μL. The formulations were deposited either by hand or by extrusion using a nozzle tool in the gap between the first and second battery poles.

Measurements conducted using a rheometer showed coatings were a gel at low shear (>1,000,000 Pa·s at shear rate of 0.001 s$^{-1}$) and a viscous liquid at high shear (1,000 Pa·s at shear rate of 100 s$^{-1}$).

Batteries with a composite safety film according to Formulation A were assessed for passivation performance and humidity tolerance at 70% relative humidity (40° C.). The composite water-responsive safety films advantageously demonstrated no change in cell voltage even after exposure to 70% relative humidity for greater than 16 days. Further, the voltage of the cells dropped upon contact with an aqueous solution such that, after 2 hours, the voltage of cells comprising the foregoing safety layer were well under 1.2V, and indeed less than 0.1V, and the pH was neutral and thus not capable of causing tissue to burn.

OTHER EMBODIMENTS

All publications, patents, and patent applications mentioned in this specification are incorporated herein by reference to the same extent as if each independent publication or patent application was specifically and individually indicated to be incorporated by reference.

While the invention has been described in connection with specific embodiments thereof, it will be understood that it is capable of further modifications and this application is intended to cover any variations, uses, or adaptations of the invention following, in general, the principles of the invention and including such departures from the present disclosure that come within known or customary practice within the art to which the invention pertains and may be applied to the essential features hereinbefore set forth, and follows in the scope of the claims.

Other embodiments are within the claims.

The invention claimed is:

1. A method of preparing a safety battery, the method comprising:
   providing a battery on a stage, wherein the battery comprises a negative pole, a positive pole, and a separated region configured to electrically separate the negative pole from the positive pole; and
   dispensing a safety ink formulation from a stationary dispenser, thereby printing a microdeposited safety ink formulation within the separated region and providing a physical connection between the negative pole and the positive pole,
   wherein the microdeposited safety ink formulation comprises one or more water permeable polymers and a metal reactant configured to form an electrical connection between the negative pole and the positive pole upon exposure to moisture.

2. The method of claim 1, wherein the dispensing step comprises dispensing the safety ink formulation from the stationary dispenser while rotating the stage.

3. The method of claim 1, further comprising, after the dispensing step:
   spinning the battery comprising the microdeposited safety ink formulation, thereby displacing the formulation across a surface portion of the negative pole and/or the positive pole.

4. The method of claim 1, wherein the metal reactant comprises one or more metal salts.

5. The method of claim 4, wherein the microdeposited safety ink formulation further comprises a reducing agent configured to reduce the one or more metal salts to provide a conductive agent that forms the electrical connection between the negative pole and the positive pole upon exposure of the microdeposited safety ink formulation to moisture.

6. The method of claim 5, wherein the microdeposited safety ink formulation comprises of from about 5 wt. % to about 95 wt. % of the one or more metal salts and about 5 wt. % to about 95 wt. % of the one or more water permeable polymers.

7. The method of claim 1, wherein the safety ink formulation comprises the metal reactant, the one or more water permeable polymers, one or more optional reducing agents, one or more optional water-soluble salts, one or more optional non-metal salts, one or more optional additives, one or more optional pigments, and one or more optional solvents.

8. The method of claim 7, wherein the safety ink formulation comprises of from about 5 wt. % to about 95 wt. % of the metal reactant and about 5 wt. % to about 95 wt. % of the one or more water permeable polymers.

9. The method of claim 7, wherein the safety ink formulation comprises of from about 20 wt. % to about 95 wt. % of the metal reactant, about 5 wt. % to about 60 wt. % of the one or more water permeable polymers, about 20 wt. % to about 95 wt. % of the one or more reducing agents, 0 wt. % to about 95 wt. % of the one or more water-soluble salts, 0 wt. % to about 95 wt. % of the one or more non-metal salts, 0 wt. % to about 5 wt. % of the one or more additives, and 0 wt. % to about 30 wt. % of the one or more pigments.

10. The method of claim 7, wherein the safety ink formulation has a viscosity of from about 100 cP to about 5000 cP.

11. The method of claim 1, wherein the stationary dispenser comprises a droplet dispenser, aerosol dispenser, ink jet printer, or direct ink printer.

12. The method of claim 1, wherein the microdeposited safety ink formulation has a dimension of from about 30 μm to about 2.0 mm in width corresponding to the separated region and configured to provide the physical connection between the negative pole and the positive pole through the separated region.

13. The method of claim 1, wherein the dispensing step comprises direct writing, aerosol printing, ink jet printing, contact printing, flexographic printing, pad printing, gravure printing, or sticker application.

14. The method of claim 1, wherein the one or more water permeable polymers comprises poly(ethylene glycol), poly(ethylene oxide), poly(vinyl alcohol), poly(vinyl acetate), poly(methyl methacrylate), poly(ethyl methacrylate), poly(dimethyl siloxane), cellulose, cellulose acetate, polystyrene, poly(vinyl chloride), polyacrylic acid, polyacrylamide, poly(N-isopropylacrylamide), polyacrylate, poly(propylene maleate), poly(propylene fumarate), hyaluronic acid, alginate, agarose, chitin, chitosan, fibrin, albumin, poly(caprolactone), poly(lactic acid), poly(glycolic acid), polyamide, poly(lysine), polyvinylester, polyvinyl pyrrolidone, pullulan, gelatin, hydroxylpropylmethyl cellulose, hydroxypropylcellulose, polysaccharide, and combinations or copolymers thereof or graft forms thereof or linker forms thereof or cross-linked forms thereof.

15. The method of claim 1, wherein the one or more water permeable polymers comprises polymethacrylates, polyvinyl alcohols, acrylate copolymers, polyvinyl esters, poly(vinyl butyrate), poly(vinyl propionate), and poly(vinyl formate)), water-soluble natural polymers, as well as copolymers thereof or combinations or cross-linked forms thereof.

16. The method of claim 5, wherein the metal reducing agent comprises an organic reducing agent, inorganic reducing agent, or particles of a metallic element or a metal alloy in its fully reduced state.

17. A safety battery manufactured using a method according to claim 1, comprising:
a negative pole;
a positive pole separated from the negative pole by a separated region; and a microdeposited safety ink comprising a metal reactant configured to form an electrical connection between the negative pole and the positive pole upon exposure to moisture,
wherein the microdeposited safety ink is disposed within the separated region, thereby providing a physical connection between the negative pole and the positive pole.

18. The battery of claim 17, wherein the microdeposited safety ink has a dimension of from about 200 μm to about 1.0 mm configured to provide the physical connection between the negative pole and the positive pole through the separated region.

19. The battery of claim 17, wherein the metal reactant comprises one or more metal salts.

20. The battery of claim 19, wherein the microdeposited safety ink further comprises a reducing agent configured to reduce the one or more metal salts to provide a conductive agent that forms the electrical connection between the negative pole and the positive pole upon exposure to moisture.

21. The battery of claim 19, wherein the microdeposited safety ink comprises of from about 5 wt. % to about 95 wt. % of the one or more metal salts and about 5 wt. % to about 95 wt. % of one or more polymers.

* * * * *